(12) United States Patent
Rettkowski

(10) Patent No.: US 9,057,458 B2
(45) Date of Patent: Jun. 16, 2015

(54) SINGLE OPERATOR TRENCHING PIPE LAYING DEVICE AND METHOD

(71) Applicant: Brady A. Rettkowski, Hermiston, OR (US)

(72) Inventor: Brady A. Rettkowski, Hermiston, OR (US)

( * ) Notice: Subject to any disclaimer, the term of this patent is extended or adjusted under 35 U.S.C. 154(b) by 0 days.

(21) Appl. No.: 13/829,996

(22) Filed: Mar. 14, 2013

(65) Prior Publication Data
US 2014/0270966 A1    Sep. 18, 2014

(51) Int. Cl.
*F16L 1/028*    (2006.01)

(52) U.S. Cl.
CPC .................................... *F16L 1/028* (2013.01)

(58) Field of Classification Search
USPC .............. 405/154.1, 157, 174, 179, 184, 177, 405/180, 181
See application file for complete search history.

(56) References Cited

U.S. PATENT DOCUMENTS 4,714,381 A * 12/1987 Hatch ............................ 405/178

* cited by examiner

*Primary Examiner* — Sean Andrish

(57) ABSTRACT

A single operator extruder main body dispenses aggregate, pipe and geotextile during a trenching operation. Lifting elements allows the main body to be manipulated by a single operator.

9 Claims, 12 Drawing Sheets

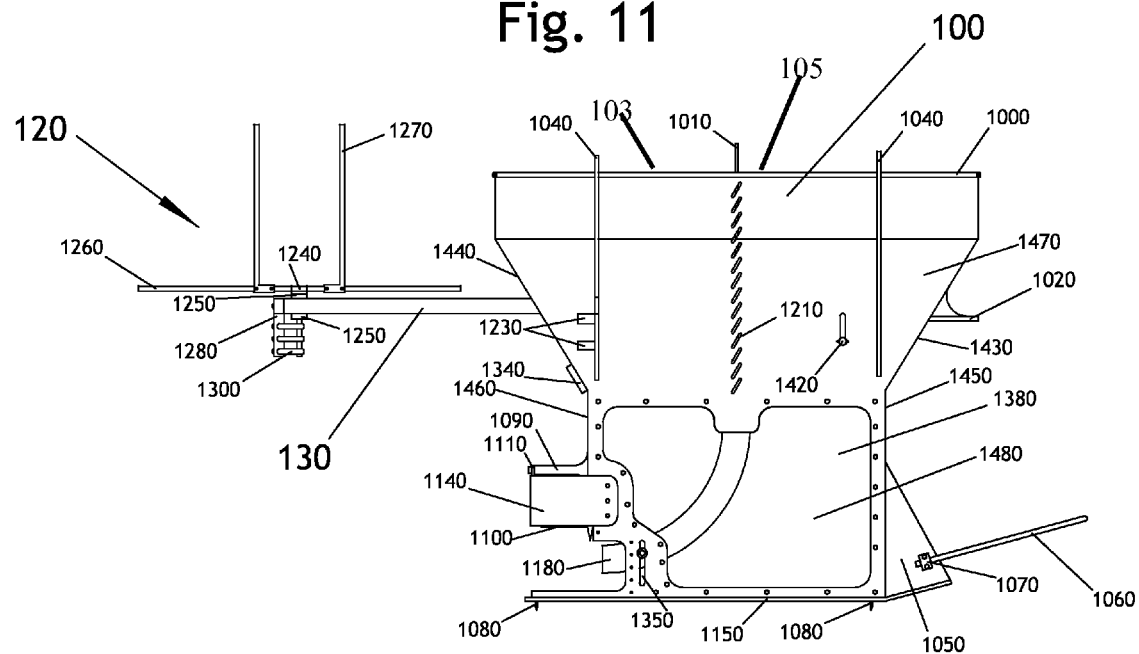
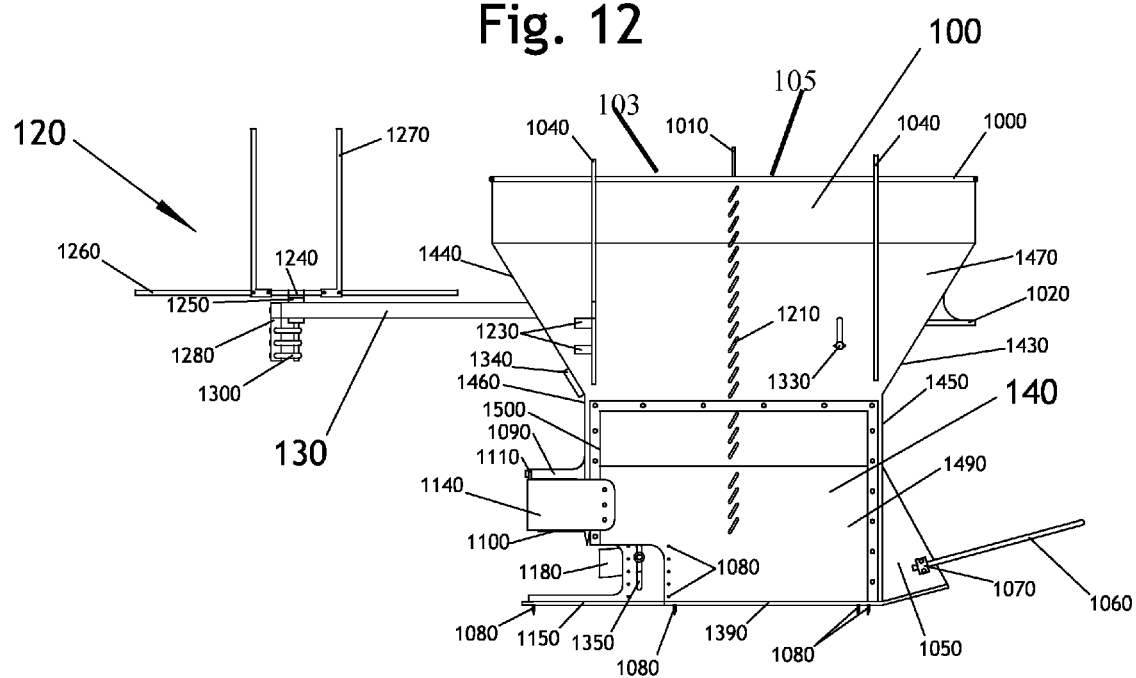

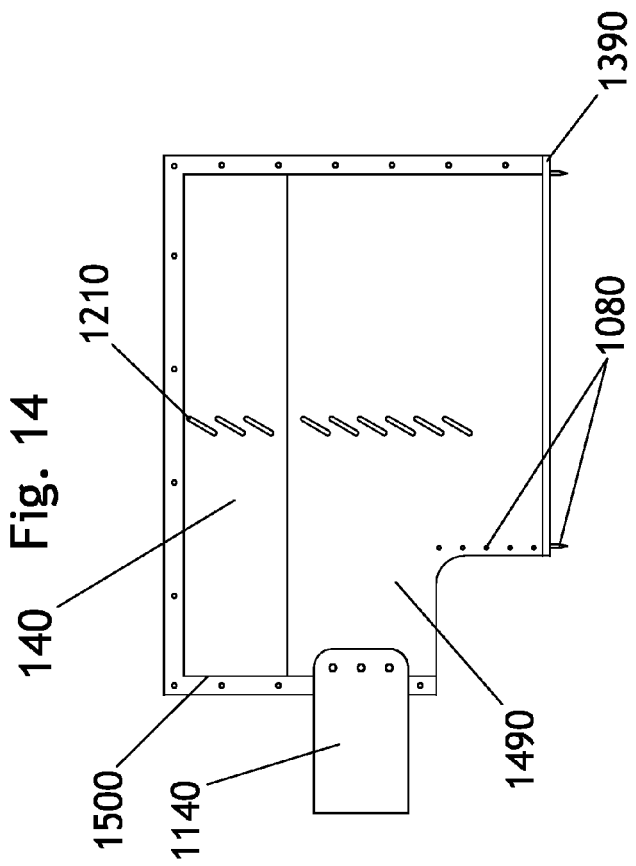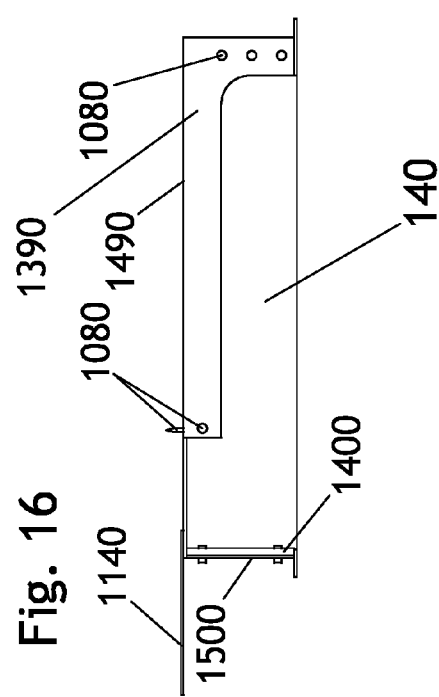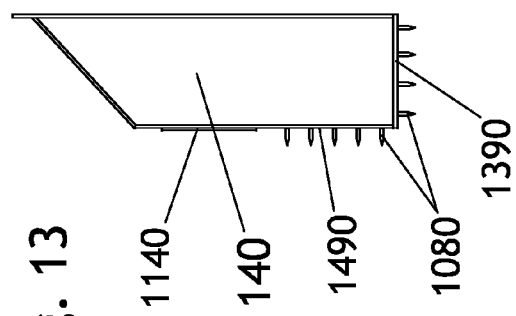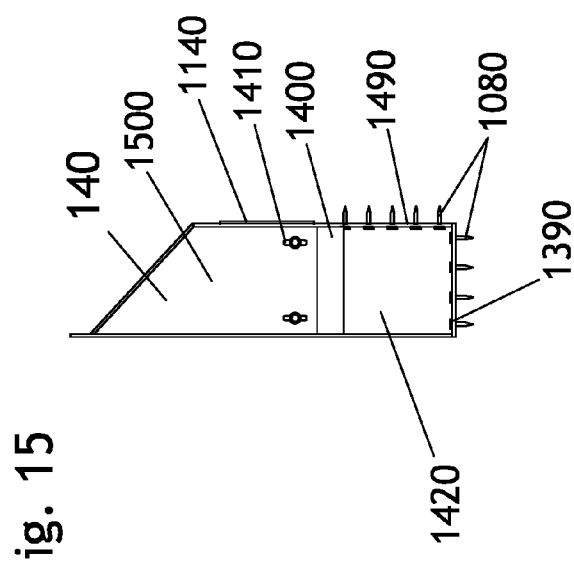

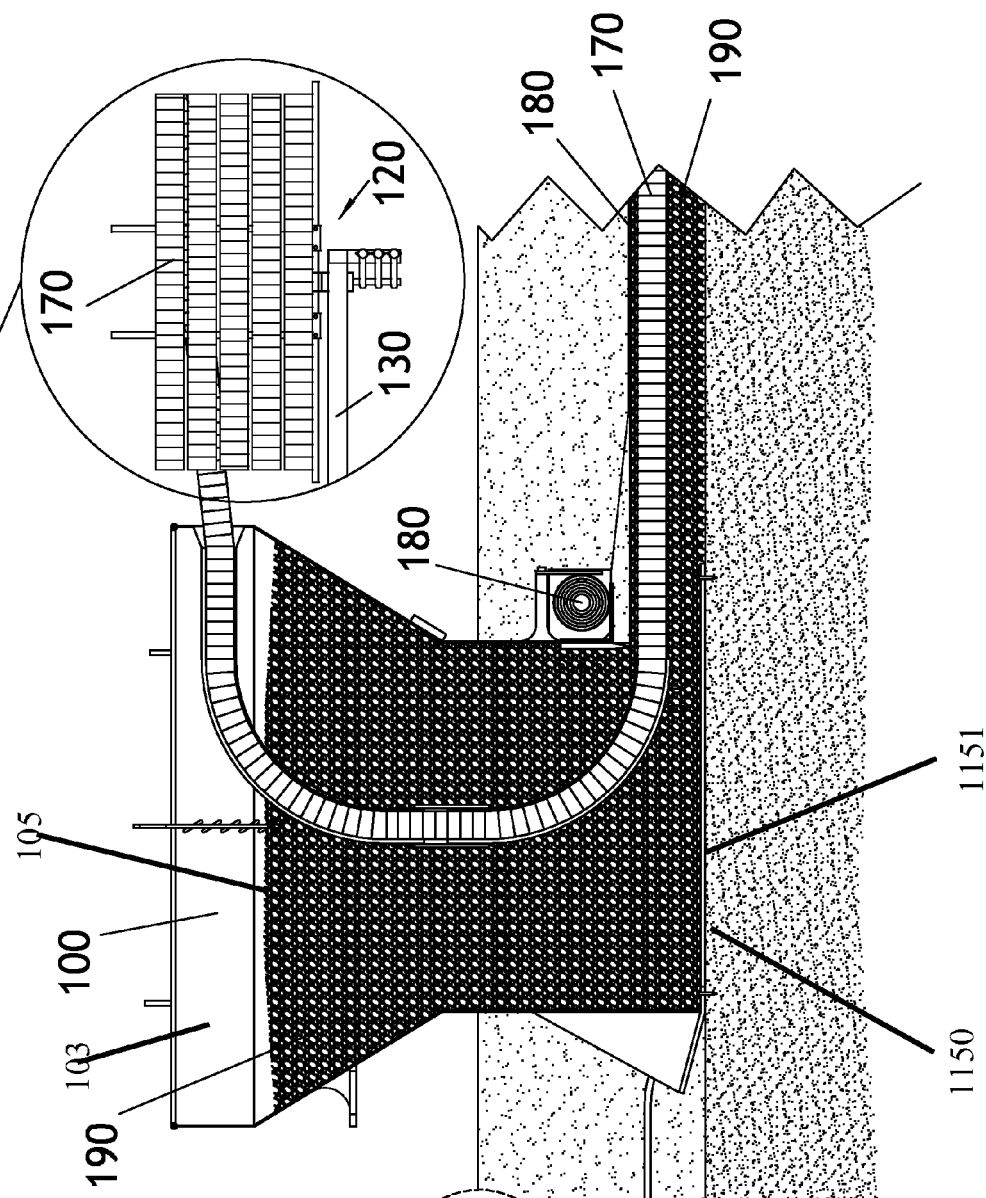

SINGLE OPERATOR TRENCHING PIPE LAYING DEVICE AND METHOD

FIELD OF THE INVENTION

This invention relates in general to a device and method of trenching. More specifically the invention relates to earth trenching and for laying conduit, cable, piping and the like in or beneath fill material. More specifically the invention related to a single operator trenching and pipe, conduit and other flexible tubular materials laying for installation of piping and cable for the installation, for example, of drain fields.

BACKGROUND OF THE INVENTION

Pipe and conduit laying devices are known including U.S. Pat. No. 4,289,424 to Shefbuch and Rue, issued Sep. 15, 1981 and titled Apparatus for Laying Conduit, Cable, and the Like in or Beneath Fill Material; U.S. Pat. No. 5,174,685 to Buchanan issued Mar. 18, 1992 and titled Flexible pipe laying and covering apparatus; U.S. Pat. No. 6,120,209 to Evans issued Sep. 19, 2000 and titled Method of Installing Drainfield Pipe; U.S. Pat. No. 6,336,770 to Evans issued Jan. 8, 2002 and titled Drainfield Pipe Installation Device; U.S. Pat. No. 7,632,408 to Everson issued Dec. 15, 2009 and titled Passive Drain Field System For Drainwater Treatment and Associated Methods; U.S. Pat. No. 4,268,189 to Good issued May 19, 1981 and titled Apparatus and Method for Supporting and Positioning Pipe During the Construction of Drain Fields and the Like; U.S. Pat. No. 5,437,424 to Netz, Sr. Issued Aug. 1, 1995 and titled Septic Pipe Field Drain Holders; U.S. Pat. No. 5,871,306 to Tilcox issued Feb. 16, 1999 and titled Pipe Supporting Apparatus; U.S. Pat. No. 5,042,958 to Stenersen issued Aug. 27, 1991 and titled Method and Apparatus for Installing Sewer and Drainage Pipe.

Use and Need—Leach Line Extrusion Process. Leach lines are used in on-site septic systems to introduce septic tank effluent into the soil for absorption and further treatment in the soil. The most common type of leach line is constructed of a trench partially filled with rock as an aggregate with perforated pipe inside the rock for the distribution of effluent. The aggregate type is not limited to rock. Other types of aggregate include, but are not limited to: tire chips, crushed glass, plastic beads, or polystyrene beads. The perforated pipe in the leach line is connected to the header pipe system which controls the distribution of effluent in the septic system.

The construction of a conventional aggregate/pipe leach line is constructed by excavating a trench on a specific grade, level or slightly sloped according to local regulatory jurisdiction. The aggregate rock that is to be below the perforated pipe is then placed to a specific depth. The perforated pipe is placed on the rock then a second layer of rock is placed to a depth just covering the pipe. Geotextile filter fabric or paper is rolled over the top of rock to protect the leach line from soil intrusion.

The conventional style of leach line construction is labor intensive as a machine must pour rock blind into the trench to a specific depth which is very hard to control. There is a lot of shovel work fine grading the rock to the desired depth within required tolerances. Perforated pipe must be laid and glued together then manually held in place or weighted to prevent movement as the upper layer of rock is placed. After the upper layer is again placed blind by machine, more shovel work is required to fine grade the top of the leach line to meet required tolerances.

There exists a style of corrugated, flexible, perforated pipe commonly constructed of HDPE plastic that is less expensive than the other types of rigid perforated pipe. This pipe conforms to the ASTM F405 standard. This pipe though, is nearly impossible to install in a leach line trench using conventional methods as it is too flexible to stay put, once placed. There is a large cost advantage to using this pipe in leach line trenches if a successful method can be created. The flexible style F405 HDPE pipe is commonly shipped in rolls. This pipe can be installed in a continuous fashion eliminating the need to glue joints. This pipe can also be installed in contoured trenches without the need to install elbow joints in the pipe.

There are designs in the existing art including pipe holders, both reusable and disposable, that hold the pipe at the required elevation in the trench before aggregate filling. These designs require that a rigid pipe is used in the trench in order to resist the forces of the aggregate as it falls into the trench. Pipe holders are either lost in the trench or are required to be retrieved out of the rock in order to be reused. With these pipe holders, there remains the requirement to fine grade the top of the leach line aggregate by hand before placing filter fabric by hand.

I propose a new method of construction of conventional style leach lines. A process of extrusion of the leach line itself would answer a lot of the problems associated with its construction. A short trench segment would be excavated to grade by conventional means such as with a backhoe or excavator. A device loaded with all the required materials could be used to extrude the leach line horizontally along the trench bottom with the pipe in place, perfectly to grade, with fabric placed on top of the aggregate. The device would be advanced along the trench by the excavation equipment just behind the excavation as it is performed. This would be accomplished in one pass with far less manual labor than the conventional method.

The patents and publications referred to herein are provided herewith in an Information Disclosure Statement in accordance with 37 CFR 1.97.

SUMMARY OF THE INVENTION

The installation of flexible piping, conduit and cable and other flexible tubular materials generally requires trenching, laying of the flexible tubular material, covering of the flexible tubular material with a fabric cover and fill. The methods and devices seen in the art usually require more than one operator. The invention of this application allows the trenching, laying of the flexible tubular material, the covering and filling to be accomplished by a single operator. An extruder main body is the structural shell of the device forming an aggregate hopper and as a main frame to attach the other components of the device. A rolled pipe turntable holds a spooled flexible tubular material such as drain field pipe. The flexible tubular material unwinds from the roll and is fed into the main body and into an upper pipe sleeve connected by a telescope sleeve cross member to a lower pipe sleeve. The upper pipe sleeve and the lower pipe sleeve guides the flexible tubular material down and under a geotextile dispenser with the flexible tubular material and fill material exiting the main body under a geotextile fabric and into the bottom of the trench. The trench is filled with spoil from trenching following any required inspection. The main body is towed by a connection to a trenching machine such as a backhoe loader, hydraulic excavators, chain style trenchers, rock wheel trencher and bucket style trenchers. A lifting coupler affixed to the main body facilitates positioning by a backhoe having vertical lifting pin attached to the trenching machine's bucket.

Use and Need—Leach Line Extrusion Device: The leach line extrusion device is a hopper that operates on a leach line trench bottom. It is equipped with a tube through which F405 pipe is fed through the device to exit horizontally at the proper level inside the trench. The pipe is secured in place at the beginning of the leach line. The hopper of the device is then filled with the required aggregate. The geotextile filter fabric is then loaded on the device and the end is also secured at the beginning of the leach line. The device is then pulled along the trench bottom just behind excavating equipment as the trench is being excavated. The excavation equipment is used to advance the device down the trench by pulling with the excavation bucket. As the device moves along the trench bottom, the aggregate feeds down through the hopper and is deposited in a horizontal layer in the trench bottom at the exact required depth. The perforated pipe feeds through the tube inside the device and is deposited inside the aggregate horizontally at the required depth. The filter fabric is rolled out on top of the aggregate as the device travels along the trench bottom. As the aggregate supply is used up, the hopper is then refilled with aggregate, as needed, until the end of the leach line is reached. The pipe and filter fabric are cut at the end of the trench and the device is removed.

Benefits of the device: Personnel only need to enter the trench at the beginning and end of each leach line. The use of the device only requires the trench to be open for a very short time. Once the device clears a spot, a cave-in will not destroy the work as the leach line construction is already complete and protected by the filter fabric. This device only requires one person with a backhoe loader to construct an entire leach line system. What previously required at least two people can now be completed in less time with much less labor. The use of the F405 pipe benefits in a large cost savings over other types of perforated pipe. The use of the continuous f405 pipe results in not having to glue pipe joints together. The use of the flexible pipe results in not having to install elbows in the pipe in order to contour the trench as needed. The accuracy of the cross section of the leach line extrusion that is produced by the device is far superior to what can be produced conventionally. Leveling layers of rock and pipe by hand to an exact tolerance is an arduous task. Aggregate is more efficiently used as accidental over filling of the trench is eliminated.

Design features: The device is constructed of steel, plastic, fiberglass, or other materials appropriate for the aggregate being used and the soil conditions it is being used in. The device is constructed with a width slightly less than the leach line trench width required. The device is narrower in length toward the bottom to allow for maneuverability inside curving trenches if needed. The length of top of the hopper is appropriate for the width of loader bucket of the machine used to fill it. The height is limited by the ability to transport the device vertically and the ability of the loader to reach the fill opening. The bottom of the device is open to allow for the feeding of the aggregate from the hopper into the trench. The majority of the weight of the aggregate is supported in the trench bottom providing low pull forces for machinery while extruding. The bottom of the device consists of runners along the bottom on the outsides parallel to the trench with a raised nose plate on the front to clear over any uneven soil in the trench bottom. The sides of the device have openings at the aggregate level to allow for the automatic sideways feeding of aggregate into rocky trenches that excavate wider than intended. The device can be equipped to accept a side extension in order to produce wider leach lines according to job or jurisdictional requirements. The extension bolts to the side of the device at the bottom of the hopper. Wider filter fabric is used to match the new trench width.

BRIEF DESCRIPTION OF THE FIGURES

The foregoing and other features and advantages of the present invention will become more readily appreciated as the same become better understood by reference to the following detailed description of the preferred embodiment of the invention when taken in conjunction with the accompanying drawings, wherein:

FIGS. 11 and 12 are side elevations of the main body (100) with and without the extension (140).

FIGS. 13 and 15 illustrate the extension (140) front and extension rear vertical wall (1500) elevation.

FIG. 14 illustrates the extension side elevation.

FIG. 16 illustrates the extension bottom plan view.

FIG. 19 is a section view A-B from FIG. 3 and FIG. 4 of the main body being towed through a trench while deepening flexible tubular material, geotextile, and fill.

Detail FIG. 20 shows the rolled pipe turntable (120) holding and dispensing a spooled flexible tubular material (170) into the pipe intake cone (1160).

DETAILED DESCRIPTION OF THE INVENTION

The preferred embodiment of the apparatus of this disclosure is seen in FIG. 1 through FIG. 4 illustrating side elevation and bottom and top plan views of the apparatus showing an extruder main body (100) which is the structural shell of the invention having a left side (1470) and a right side (1480). The main body (100) is a hopper to store aggregate and also is a main frame to attach the other components of the device. The main body (100) is generally constructed from rigid planar materials including steel plate or sheet metal and other materials having structural characteristics capable of withstanding the receiving and expulsion of aggregate and of the structural stresses of being towed in a trench while filled with aggregate, sand or other trench filling materials.

Figure 23:
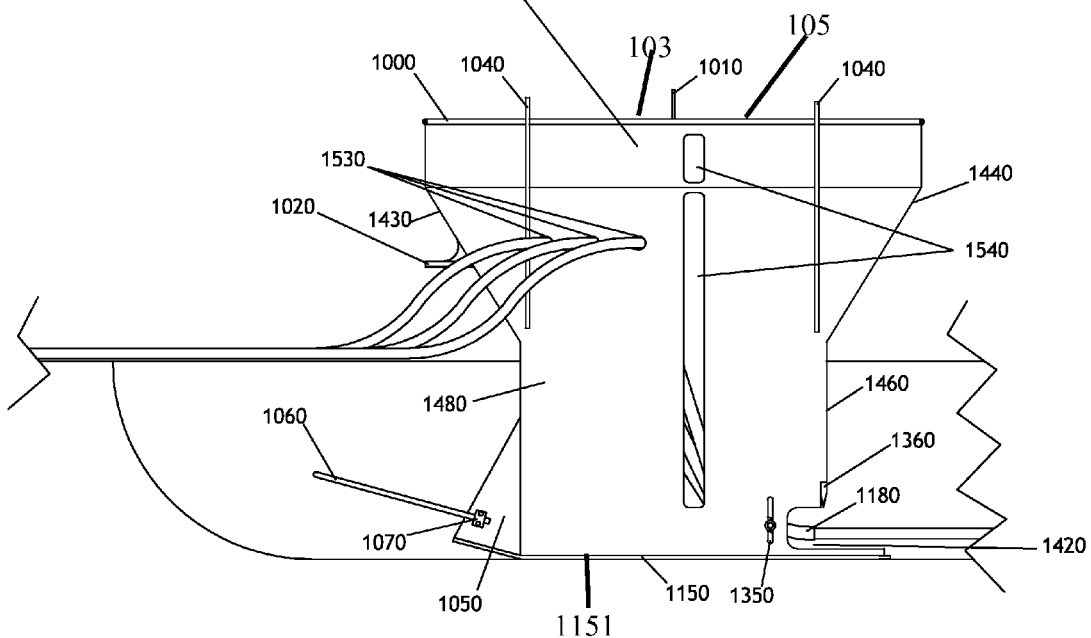
FIG. 23 illustrates an alternative embodiment to the installation of spooled pipe (170) with cable shown being fed into side cable intake ports (1530) located on either the left side (110) or the right side (120) of the device and are used to intake the cable or pipe product into the device.
Figure 24:
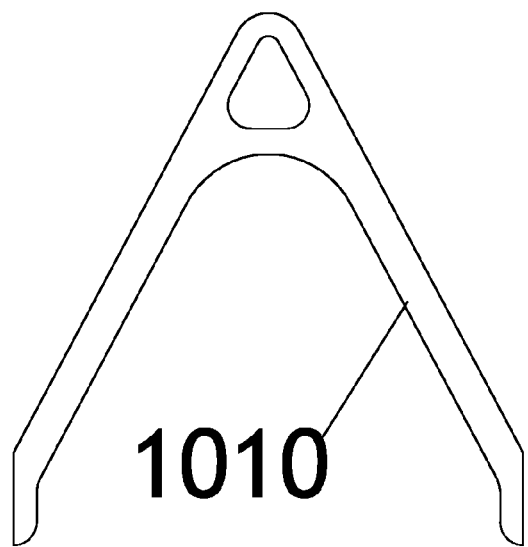
FIG. 24 illustrates the lifting eye cross member (1010).

Also shown in FIGS. 1, 2, 3 and 4 is a rolled pipe turntable (120) which, in the preferred embodiment, is a collapsible framework used as a rotating platform to hold a spooled conduit, cable or spooled pipe (170). The spooled pipe (170) unwinds from the roll as needed in order to feed into the device. The rolled pipe turntable (120) rotates as needed allowing the spooled pipe (170) to feed freely. The rolled pipe turntable (120) is not required for operation of the device as it may be desirable to use loose sections of pipe for shorter runs of leach line or to use up remnant pieces of pipe or to lay cable as seen in FIG. 23. The primary type of pipe (170) that the device is designed to use is the single wall, corrugated, perforated pipe constructed of high density polyethylene (HDPE) known as ASTM F405. Other types of flexible pipe may be also be suitable for use in the device.

Seen in FIG. 1 through 4 is the turntable arm (130) which is elongated and constructed from a rigid material, including metals and other rigid structural materials. The turntable arm (130) is removably connected to the main body (100) through the turntable arm mounts (1230). The turntable arm mounts (1230) are attached to both of the extruder main body (100) vertical side walls. The turntable arm mounts (1230) hold the turntable arm pin and allow it to fold forward against the main body (100) when the extruder main body (100) is configured for transport. The turntable hub (1240) rests inside turntable bearings (1250). The turntable hub (1240) has a vertical shaft that extends well below a lower turntable bearing. The turntable hub (1240) has a horizontal plate centered on top of the shaft and has square tube fittings arranged in a radial pattern laid horizontally to accept the turntable spokes. The turntable arm mounting pin (1550) is immovably fixed to the end of the turntable arm, by welding or similar manner, and rotatably fits into the turntable arm mounts (1230). For operations the turntable arm is extended. For transit the turntable arm is rotated against the main body (100) and secured by the turntable closed lock (1330).

The turntable bearings (1250) are, in the preferred embodiment, flange type bearings bolted to the upper and lower sides of the turntable arm (130). The turntable bearings (1250) hold the turntable hub (1240) and allow free movement of the turntable (120). The turntable spokes (1260) are square tubes attached to the turntable hub (1240) by a square pilot fitting extending from the inside of the tube end. The turntable spokes (1260) are held in place by the turntable perimeter strap. The turntable spokes (1260) support the pipe spool and rotate with the turntable hub while dispensing pipe. The pipe roll control arms (1270) are rigid vertical tubes that pin to the turntable spokes (1260) by way of a saddle fitting at the bottom end of the turntable arms (130). The pipe roll control arms (1270) are located at a constant radius from the center of the turntable hub (1240) to match the pipe roll inner diameter. The turntable drag arm (1280) is located at the rear end of the turntable arm (130). The turntable drag arm (1280) slides inside the open rear end of the tubular turntable arm (130). The turntable drag arm (1280) holds the turntable drag straps (1300). The turntable drag straps (1300) are attached to the turntable drag arm (1280). The turntable drag straps (1300) are rubber straps under tension that run around the turntable hub shaft to provide the drag necessary to stop the turntable when the extruder comes to rest after an advancement. By varying the number of turntable drag straps engaged, the amount of turntable drag can be adjusted. As the pipe roll decreases in diameter, less drag may be desired. The turntable arm retaining strap (1290) retains the turntable drag arm by connecting between the turntable arm (130) and the turntable drag arm. The turntable bearings (1250) are flange type bearings bolted to the upper and lower sides of the turntable arm. The turntable bearings hold the turntable hub and allow free movement of the turntable. The turntable bearings could also be configured as flanged bushings of UHMW material.

The turntable perimeter strap (1310) encompasses the turntable spokes (1260) through slots or loops in the end of the turntable spokes (1260). The turntable perimeter strap is nylon or other suitable material and is held under tension by a ratchet or bungee device. The turntable perimeter strap (1310) also prevents any pipe from being snagged by a turntable spoke (1260) in case of an over spin condition of the turntable. The turntable arm open lock (1320) is located on the outside of the rear vertical side wall of the extruder main body (100). The turntable arm open lock (1320) is, in the preferred embodiment, a pin or cam-lock device that retains the turntable arm (130) in the open position. One turntable open lock is located on each side of the device. The turntable closed lock (1330), preferably comprised of an elastic or rubber strap, is located on the outside of the vertical side wall of the extruder main body (100) towards the front of the device. One turntable open lock (1320) is located on each side of the device. The mounting pin extends both directions from the arm (above and below) in order to allow the arm to function on either side of the device. The turntable arm (130) is just turned upside down in order to operate on the opposite side of the device. It may desirable to operate the arm on one side of the other according to the placement of spoils along the trench or the direction of rotation that the pipe roll was wound at the factory.

The turntable component storage rack (1340) is located on the outside of the sloped rear end wall of the device. The turntable component storage rack (1340) is a row of square tubes that hold the turntable spokes (1260) and turntable control arms during transport or when not being used. The lower pipe sleeve adjustment slots (1350) are located in the lower side walls of the extruder main body (100). The lower pipe sleeve adjustment slots (1350) allow for the vertical adjustment of the lower pipe sleeve and the pipe elevation within the leach line extrusion. The aggregate screed blade (1360) is bolted inside the lower rear of the extruder main body (100) just above the extrusion exit opening (1420). The extrusion exit openings (1420) are located in the lower rear of the extruder main body, the lower rear of the line width extension, the lower side plates of the extruder main body, and the extension. The aggregate screed blade (1360) is a hardened steel replaceable plate that is vertically adjustable according to the desired leach line thickness.

Figure 5:
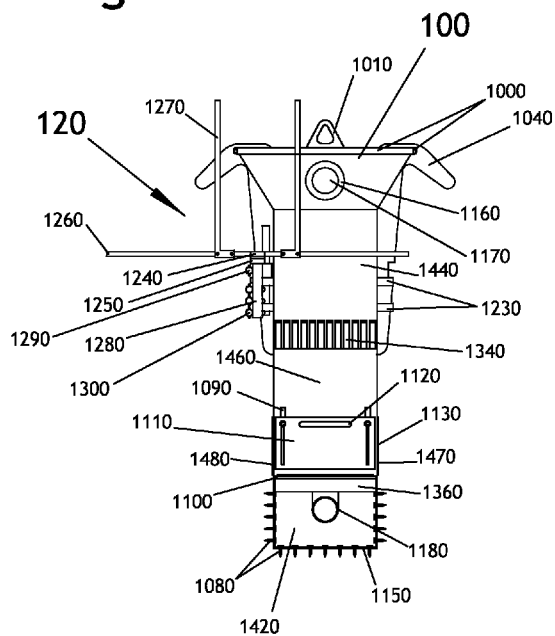
FIGS. 5 and 6 are front and rear elevations without extensions.
Figure 6:
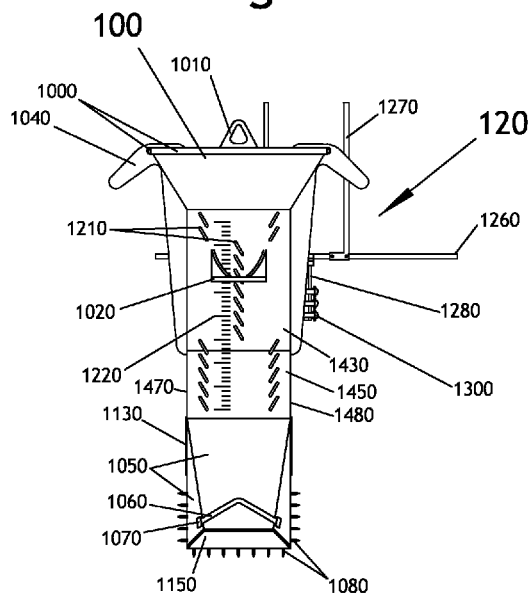
Figure 7:
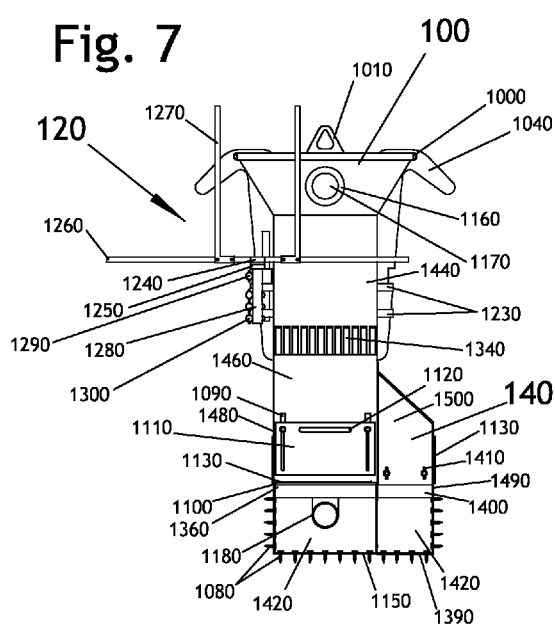
FIGS. 7 and 8 are front and rear elevations with extensions.
Figure 8:
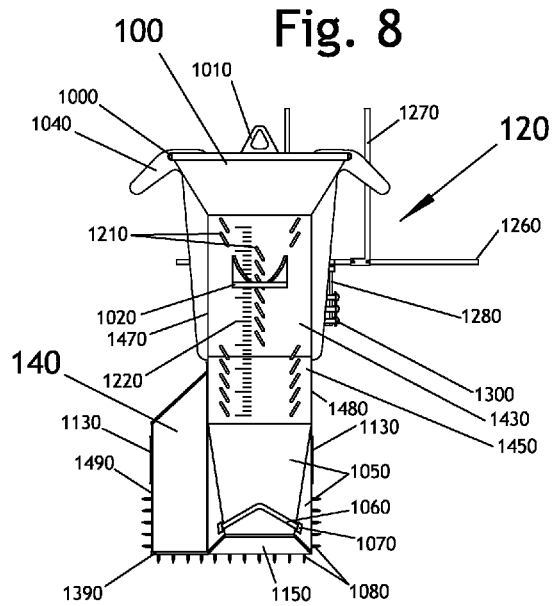

FIGS. 5, 6, 7 and 8 illustrate front and rear elevations of the device. Seen is the top rail strapping edge (1000) is comprised of a slotted pipe that fits over the top edge of the extruder main body (100). The primary purpose of the top rail strapping edge (1000) is to provide a round edge suitable to fit a load strap without having to further protect the strap from a sharp edge during transport between job sites. The top rail strapping edge (1000) also reinforces the top rail of the extruder main body (100). The lifting eye cross member (1010) is attached to the inside walls of the extruder main body (100) and extends above the center of the device main body (100). The lifting eye cross member (1010) provides a convenient and safe way of lifting the device with a crane when needed. The lifting eye cross member (1010) is sufficiently sized to allow the direct engagement and release of a crane hook without another chain or clevis in between. Seen in FIGS. 7 and 8 is the line width extension (140) which is used to produce leach lines of greater width than what the main device will produce. Some regulatory jurisdictions will require leach line trenches to be constructed with differing dimensional standards. The line width extension bolts to the side of the main body of the device. The main body has a removable (1370) side plate that must be removed in order to attach the line width extension. The opening created by the removal of the side plate (1370) is the extension supply opening (1380). This opening allows aggregate to feed into the line width extension. Line width extensions may also be operated on both sides of the device simultaneously if the main body is configured as such. The extension skid plate (1390) is located at the bottom of the extension. The extension skid plate holds the scarifiers for the line width extension. The extension skid plate has a large opening to allow the weight of the aggregate to rest in the trench bottom. The extension skid plate has a narrow runner extending along the inside of the device close to the trench wall.

Also seen in FIGS. 6-8 is the trenching bucket lifting coupler (1020) is attached to the extruder main body (100) front sloped wall (1430). The trenching bucket lifting coupler (1020) is a horizontal lifting lug with a hole to accept the pin from the trenching bucket lifting pin (1030). The opening is triangular in shape with radiused corners. The opening is much larger in the rear than in the front. This allows for easy capture of the device with the trenching bucket lifting pin (1030). The front of the opening matches the diameter of the trenching bucket lifting pin (1030). The trenching bucket lifting coupler (1020) provides a way to lift the extruder into and out of the trench using the excavating machine's trenching bucket without any outside action required by personnel on the ground or the excavating machine (150) operator. The clearance inside the trench is minimal between the device and the trench walls. The excavating machine (150) operator has, by far, the best vantage point from which to safely place the device into the trench. The excavating machine (150) commonly used for leach line construction is the backhoe loader. Other suitable machines may include hydraulic excavators, chain style trenchers, bucket wheel style trenchers, or rock wheel trenchers. The loader bucket (160) is used to load the device with aggregate. The loader bucket commonly used is part of the backhoe loader backhoe. Other suitable styles of loader buckets used may be on wheel loaders, skid steer wheel loaders, or tracked loaders.

FIGS. 6 and 8 also illustrate the skid nose (1050) is composed of plates extending between the extruder skid plate and the extruder main body (100) front wall. The skid nose (1050) provides a place to mount the pull cable. The plate also prevents the top of extruder skid plate from accumulating dirt. The pull cable (1060) provides a way for the excavating machine (150) to advance the device down the trench during excavation. The pull cable (1060) is engaged by one of the excavating machine's bucket teeth when pulling. The pull cable (1060) is easily replaceable when worn. The cable attachment fittings (1070) attach the pull cable (1060) to the skid nose (1050).

Also seen in FIG. 5 through 8 are scarifiers (1080) provide scarification along the trench bottom and the trench sidewalls as the device is advanced down the trench. Some soils are susceptible to compaction and smearing. The scarifiers (1080) are usually installed only when working in these soils. The scarifiers (1080) ensure that the soil is properly loosened just before the aggregate is placed in the trench. The scarifiers (1080) are easily replaceable when needed.

FIGS. 1, 5-7 shows a geotextile fabric holder brackets (1090) are attached to the outside of the extruder main body (100) vertical rear wall. The geotextile fabric holder brackets (1090) are threaded to accept the bolts that hold the geotextile fabric door (1110). The geotextile fabric door (1110) is an ultra high molecular weight plastic (UHMW) plate bolted to the geotextile fabric holder brackets. The geotextile fabric door has vertical slotted holes to allow for the opening of the holder when loading fabric. The fabric holder floor plate (1100) is a horizontal plate attached outside of the rear vertical wall (1460) of the extruder main body (100). The fabric holder floor plate (1100) holds the horizontal slide plate and the geotextile filter fabric roll. The geotextile fabric door handhold (1120) is a horizontal slot centered just below the top of the geotextile fabric door to allow the door to be opened by hand. The geotextile slide plates (1130) are UHMW plates located on the rear vertical wall of the extruder main body (100) and the geotextile fabric floor plate. The geotextile slide plates allow the geotextile fabric to roll freely as needed. The geotextile slide plates are replaceable as needed. The geotextile side protector plates (1140) are UHMW plates bolted to the vertical sidewall of the extruder main body and the line width extension (140) using countersunk bolts. The geotextile side protector plates protect the fabric roll from tree roots, large rocks, or other obstructions encountered inside the trench. The geotextile side protector plates also exert pressure to the sides of the roll to stabilize it from bouncing and to prevent over spinning as the device comes to rest. The geotextile filter fabric (180) used in the device is produced in rolls of flat fabric. The filter fabric used is sized to match the trench width and meet local jurisdictional standards. The filter fabric is used to cover the leach line aggregate and prevent soil intrusion from above the leach line. Some soils and jurisdictions may require the use of paper based products instead of fabric. The leach line aggregate (190) most commonly used is mined, washed, and graded river rock or blasted, crushed, and graded, bedrock. Other types of aggregate may include, but are not limited to, tire chips, crushed glass, glass beads, plastic beads, or polystyrene beads.

The extruder main body (100) is also composed of the following structures: The rear vertical wall (1460) is the lower portion on the rear of the extruder main body. The left side vertical wall (1470) is the lower portion of the left side of the extruder main body. The right side vertical wall (1480) is the lower portion of the right side of the extruder main body.

The line width extension (140) is also composed of the following structures: The extension side vertical wall (1490) is the vertical sidewall of the extension. The extension rear vertical wall (1500) is at the rear of the line width extension (140).

FIGS. 5-8 also shows the extruder skid plate (1150) is located at the bottom of the device. The extruder skid plate (1150) has a large center opening (1151) to allow the weight of the leach line aggregate to be supported inside the trench bottom instead of the device. The extruder skid plate (1150) holds the bottom mounted scarifiers of the extruder main body. The extruder skid plate (1150) is fashioned to provide narrow runners that run along just inside the edge, most of the way along the bottom of the device. The extruder skid plate (1150) has an upwardly angled section below the skid nose (1050) to provide clearance of uneven soil in the trench. The extruder skid plate (1150) can be fitted with replaceable UHMW wear plates.

FIGS. 5 and 7 illustrate the pipe intake cone (1160) is located in the upper vertical wall of the extruder main body and connects to the upper pipe sleeve (1170). The pipe intake cone (1160) guides the flexible pipe into the upper pipe sleeve (1170). The upper pipe sleeve (1170) is attached to the pipe intake cone (1160) and the telescope sleeve cross member. The upper pipe sleeve allows the pipe to feed down through the aggregate stored in the extruder main body (100).

Figure 9:
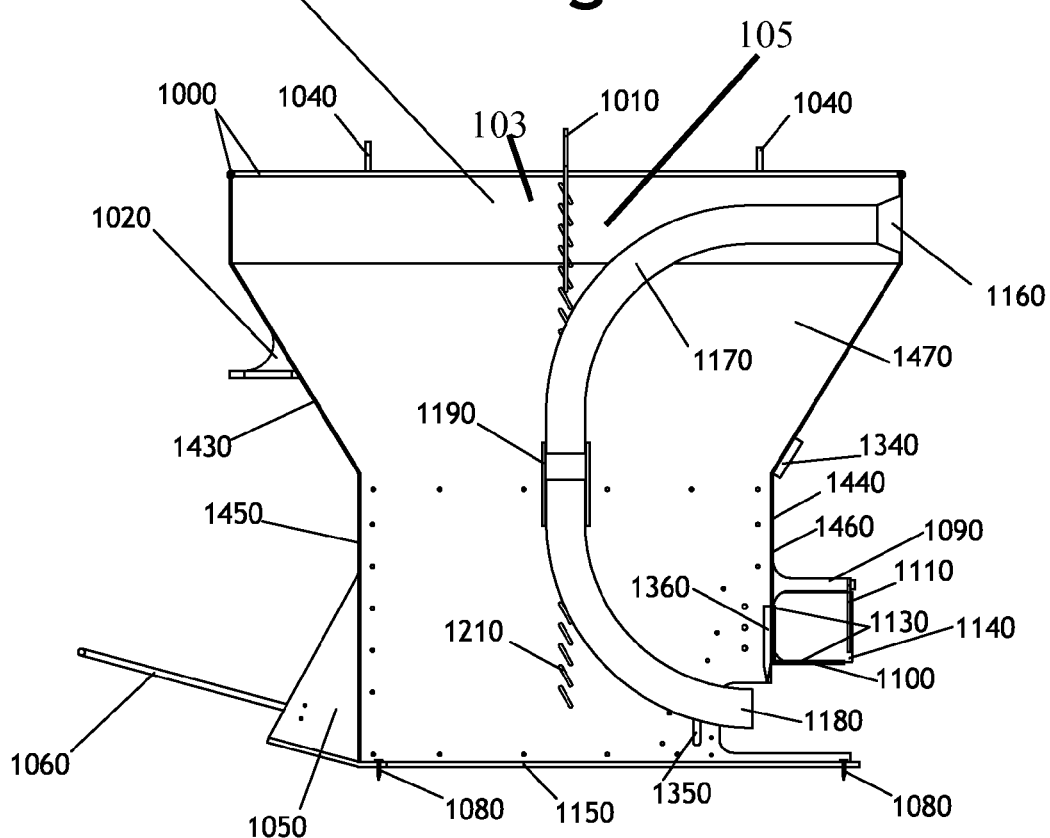
FIG. 9 illustrates a main body vertical section showing the upper pipe sleeve (1170) and lower pipe sleeve (1180).
Figure 10:
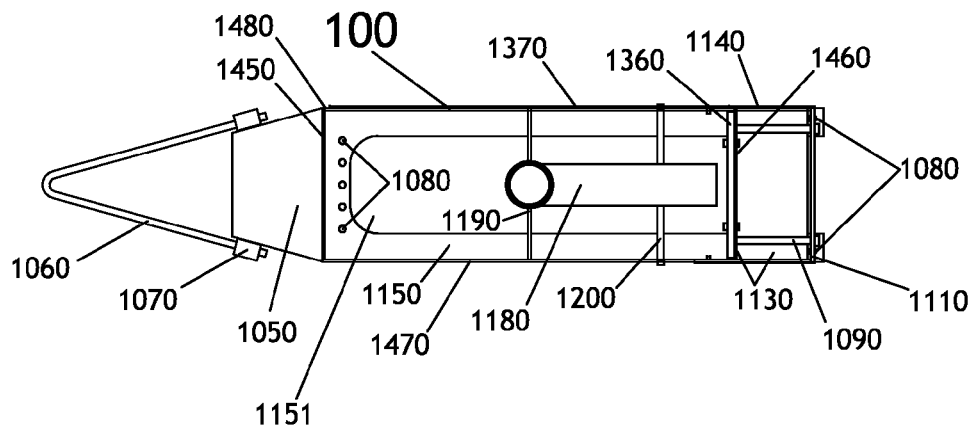
FIG. 10 illustrates a main body horizontal section C-D from FIG. 2 showing the lower pipe sleeve (1180).

FIGS. 9 and 10 show the lower pipe sleeve (1180) is attached to the lower pipe sleeve mounts and rests inside the telescope sleeve cross member. The lower pipe sleeve delivers the pipe through the aggregate to the proper vertical location within the leach line extrusion. The lover pipe sleeve is vertically adjustable. The telescope sleeve cross member (1190) is attached to the inside of the vertical side walls of the extruder main body and the upper pipe sleeve. The telescope sleeve cross member holds the lower pipe sleeve. The telescope sleeve cross member also ties together the center of the extruder main body. The lower pipe sleeve mounts (1200) are connected to the lower pipe sleeve and the extruder main body through the lower pipe sleeve adjustment slots. The lower pipe sleeve mounts hold the lower pipe sleeve in place. The lower pipe sleeve mounts also tie together the lower portion of the extruder main body. The aggregate volume slots (1210) are located on both sides and the front of the extruder main body. The aggregate volume slots are used to determine the volume of aggregate in the extruder. The slots on the front of the device are located toward the side edges of the front to allow for easier viewing around the bucket of the excavating machine.

Figure 18:
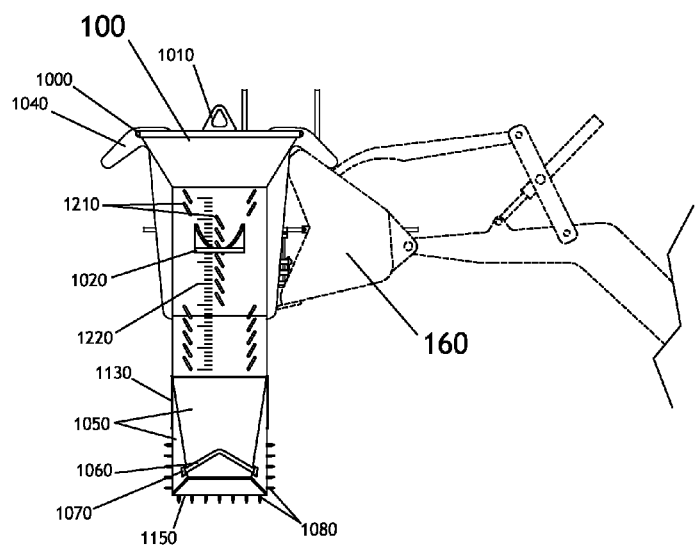

Also shown in FIGS. 6, 8 and 18 is the aggregate volume scale (1220) located on the front of the extruder main body vertical wall. The front vertical wall (1450) is the lower vertical portion on the front of the extruder main body. The aggregate volume scale (1220) is calibrated in the distance of trench left until the extruder is empty of aggregate.

Figure 1:
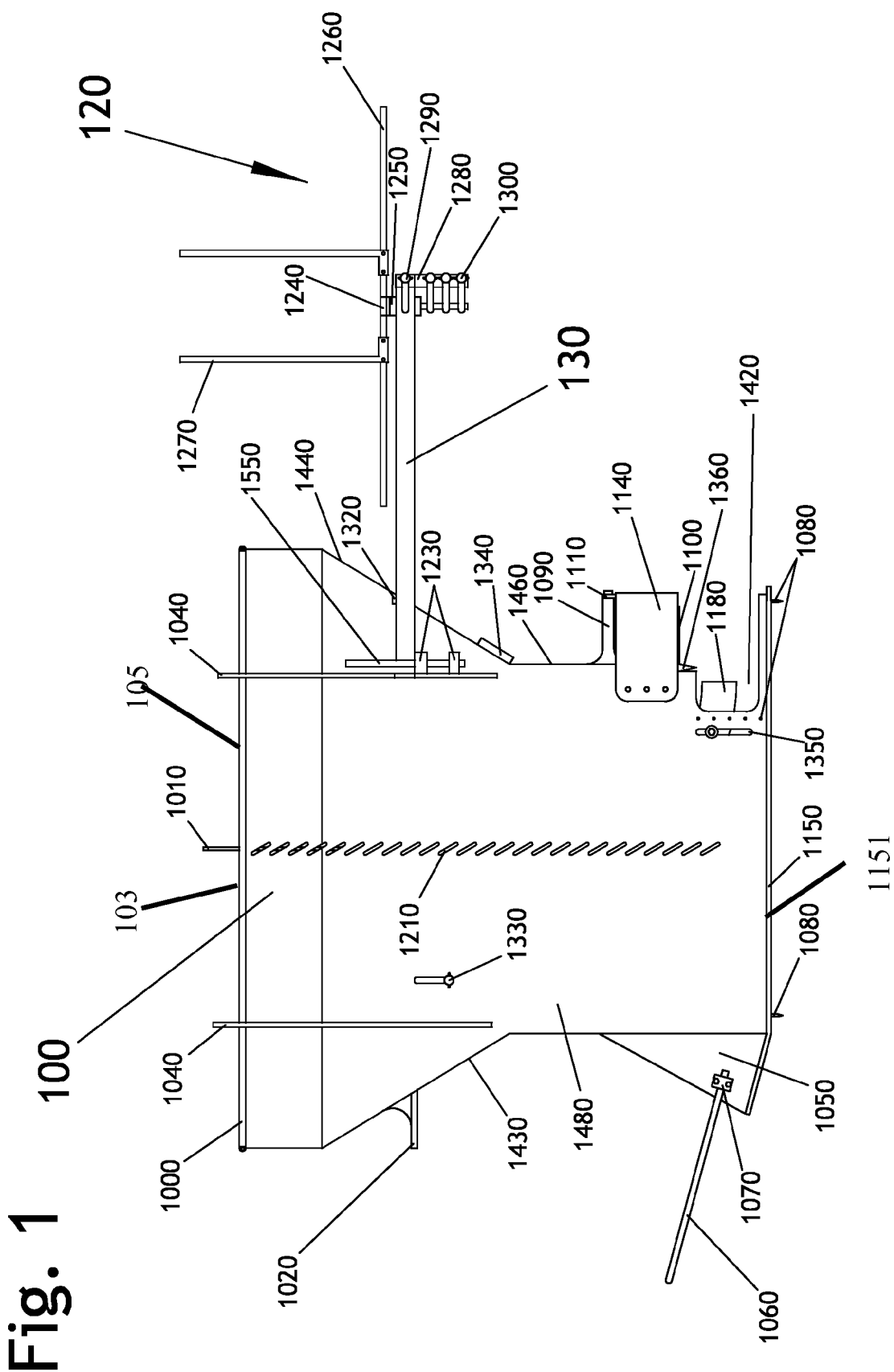
FIGS. 1, and 2 illustrate right and left side elevation and bottom and top plan views showing an extruder main body (100) which is the structural container for the device.

FIGS. 1 and 9 show the lower pipe sleeve adjustment slots (1350) are located in the lower side walls of the extruder main body. The lower pipe sleeve adjustment slots allow for the vertical adjustment of the lower pipe sleeve and the pipe elevation within the leach line extrusion. The aggregate screed blade (1360) is bolted inside the lower rear of the extruder main body (100) just above the extrusion exit opening. The aggregate screed blade (1360) is a hardened steel replaceable plate that is vertically adjustable according to the desired leach line thickness.

Figure 2:
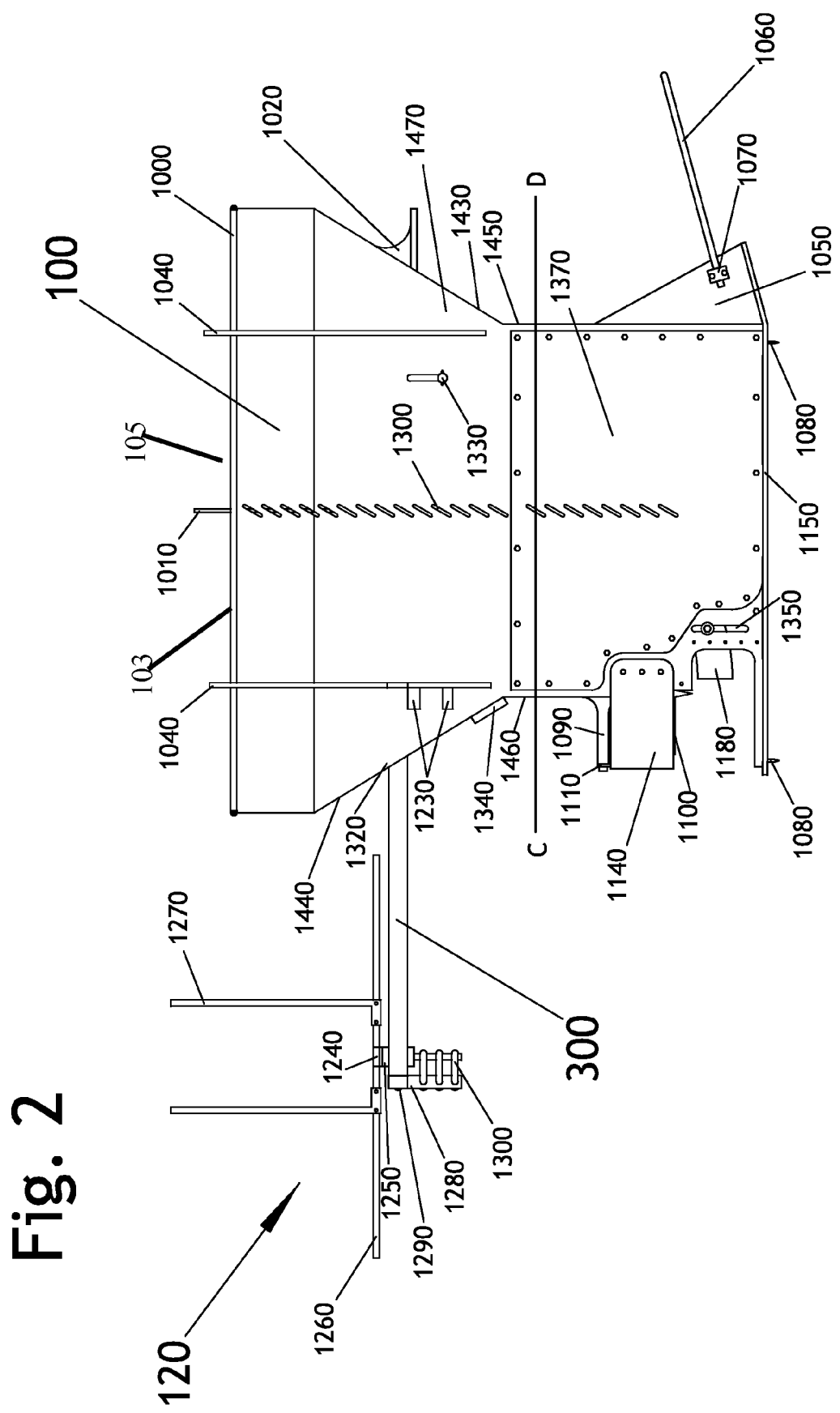
Figure 3:
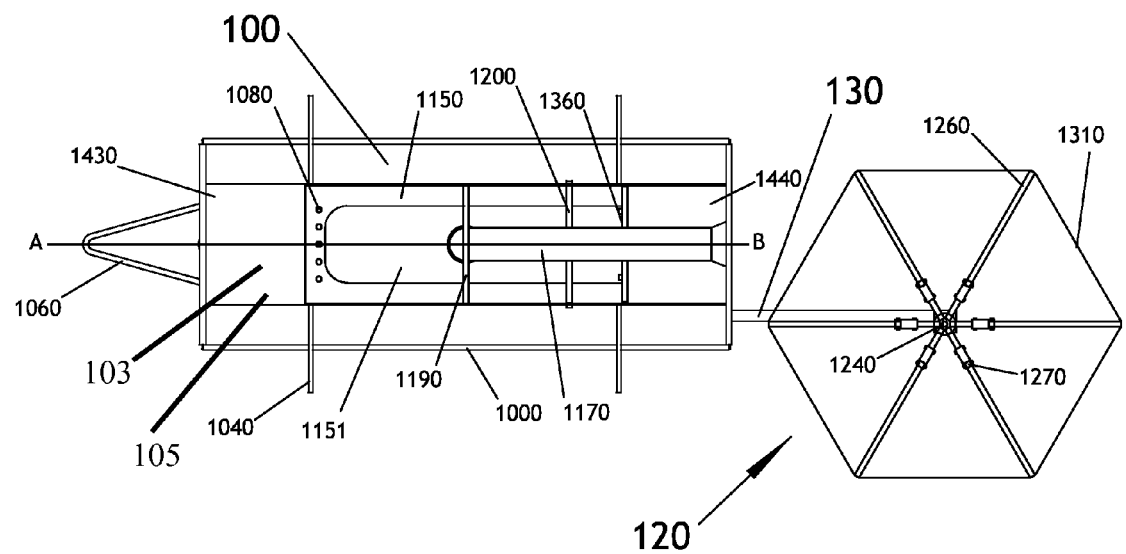
FIGS. 3 and 4 illustrate top and bottom plan views showing an extruder main body (100) which is the structural container for the device.
Figure 4:
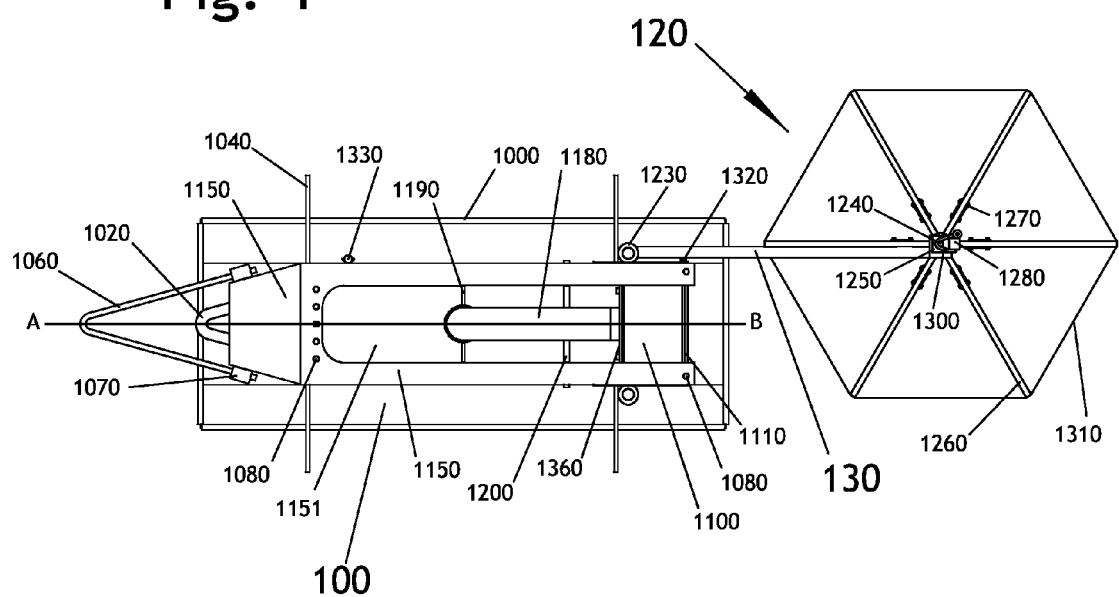

FIGS. 1 and 2 show the turntable closed lock (1330) which is located on the outside of the vertical side wall of the extruder main body (100) towards the front of the device. The turntable closed lock (1330) is, in the preferred embodiment, an elastic or rubber strap which secures the turntable arm (130) during transit. One turntable close lock (1330), provided for example by a rubber hood strap, is located on each side of the device. The turntable component storage rack (1340) is located on the outside of the rear sloped wall (1440) which is the sloped portion on the rear of the extruder main body. The turntable component storage rack (1340) is a row of square tubes that hold the turntable spokes and turntable control arms during transport or when not being used.

FIGS. 13, 14, 15 and 16 primarily show the line width extension (140) which is attached to the main body (100) to extend the total width for a wider trench. Also shown are the scarifiers which (1080) are outwardly extending and generally formed of hardened steel or carbide which are threaded and secured with a nut for ease of replacement when broken or worn. Also seen are the geotextile side protector plates (1140) which can be a rigid material including metals and plastic, with UHMW plates preferred because of the low coefficient of friction, with the geotextile side protector plates (1140) bolted to the vertical sidewall of the extruder main body (100) and the line width extension using countersunk bolts. The geotextile side protector plates (1140) protect the fabric roll from tree roots, large rocks, or other obstructions encountered inside the trench. The geotextile side protector plates (1140) also exert pressure to the sides of the roll to stabilize it from bouncing and to prevent over spinning as the device comes to rest. Also illustrated is the extruder skid plate (1150) which is located at the bottom of the main body (100). The extruder skid plate (1150) has a large center opening (1151) to allow the weight of the leach line aggregate to be supported inside the trench bottom instead of the device. The extruder skid plate (1150) holds the bottom mounted scarifiers of the extruder main body (100). The extruder skid plate (1150) is fashioned to provide narrow runners that run along just inside the edge, most of the way along the bottom of the device. The extruder skid plate (1150) has an upwardly angled section below the skid nose to provide clearance of uneven soil in the trench. The extruder skid plate (1150) can be fitted with replaceable UHMW wear plates. Viewed as well are the aggregate volume slots (1210) which are located on both sides and the front of the extruder main body (100). The aggregate volume slots (1210) are used to determine the volume of aggregate in the extruder main body (100). The slots on the front of the device are located toward the side edges of the front to allow for easier viewing around the bucket of the excavating machine.

FIGS. 13 through 16 also illustrate the extension screed plate (1400) which is bolted inside the rear of the line width extension. The extension screed plate (1400) is a hardened steel replaceable plate that is vertically adjustable according to the leach line thickness desired. The extension screed blade adjustment slots (1410) are located in the rear of the line width extension just above the extrusion exit opening of the line width extension. The extension screed adjustment slots (1410) are vertical slots through which the extension screed blade is bolted.

Figure 17:
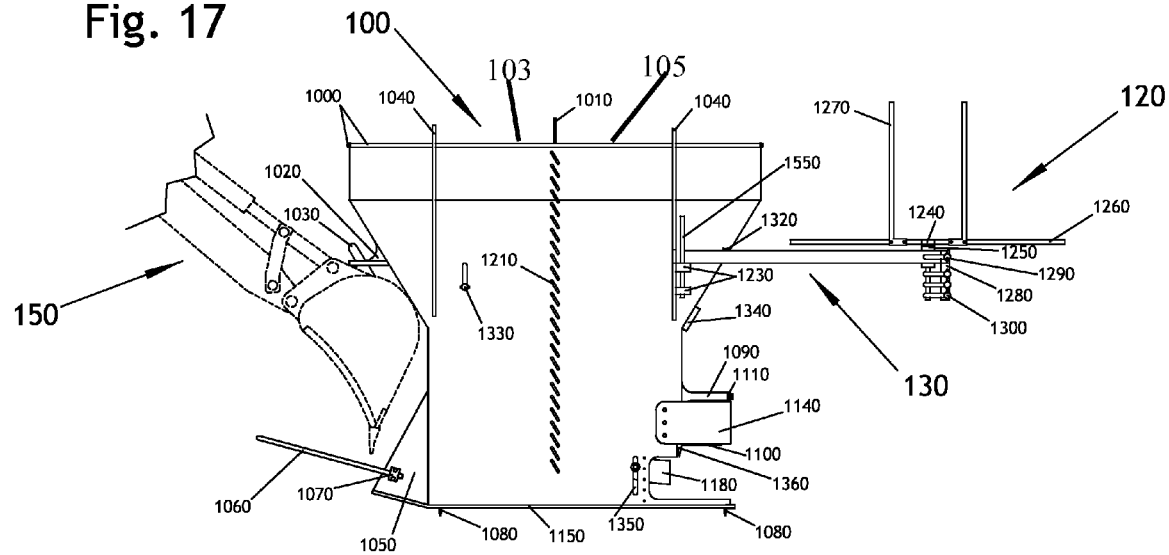
FIGS. 17 and 18 show the devices for lifting the main body (100). Illustrated are the lifting eye cross member (1010), the trenching bucket lifting coupler (1020), the trenching bucket lifting pin (1030) and the loader bucket lifting couplers (1040).

FIGS. 17 and 18 illustrate the lifting eye cross member (1010), the trenching bucket lifting coupler (1020), the trenching bucket lifting pin (1030) and the loader bucket lifting couplers (1040). The lifting eye cross member (1010) is attached to the inside walls of the extruder main body and extends above the center of the device. The lifting eye cross member (1010) provides a convenient and safe way of lifting the device with a crane when needed. The lifting eye is sufficiently sized to allow the direct engagement and release of a crane hook without another chain or clevis in between. The trenching bucket lifting coupler (1020) is attached to the extruder main body wall. The trenching bucket lifting coupler (1020) is a horizontal lifting lug with a hole to accept the pin from the trenching bucket lifting pin (1030). The opening is triangular in shape with radiused corners. The opening is much larger in the rear than in the front. This allows for easy capture of the device with the trenching bucket lifting pin. The front of the opening matches the diameter of the trenching bucket lifting pin (1030). The trenching bucket lifting coupler (1020) provides a way to lift the extruder into and out of the trench using the excavating machine's trenching bucket without any outside action required by personnel on the ground or the excavating machine operator. The clearance inside the trench is minimal between the device and the trench walls. The excavating machine operator has, by far, the best vantage point from which to safely place the device into the trench. The trenching bucket lifting pin (1030) is a vertical pin attached to the center rear excavating machine's bucket. The methods of attachment may vary according to the machine being used. The trenching bucket lifting pin (1030) may be welded, bolted, riveted, or pinned on to the trenching bucket. The pin is designed to connect to the trenching bucket lifting coupler (1020) when lifting the extruder. The trenching bucket lifting pin (1030) is designed to remain clear of all excavation activities. The loader bucket lifting couplers (1040) provide a way to safely and positively carry the extruder with the loader bucket of the loader being used. The loader bucket lifting couplers allow the loader to lift carry and place the extruder without any outside help on the ground. This method of lifting the device is much safer that chain, cable, of strap lifting the device as the control of the device while carrying is much more positive with absolutely no swinging of the device. Personnel are not required to be exposed to the danger of being crushed between the machine and the device in order to hook or unhook it. Personnel are also not required to stand on the edge of a trench in order to hook or unhook the device.

FIGS. 19 and 20 are a cross-section through the main body (100) and a detail showing the rolled pipe turntable (120).

Figure 21:
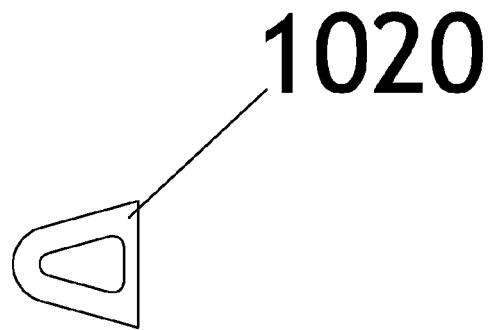
FIG. 21 illustrates the trenching bucket lifting coupler (1020).

FIG. 21 is a detail of the lifting eye cross member (1010).

Figure 22:
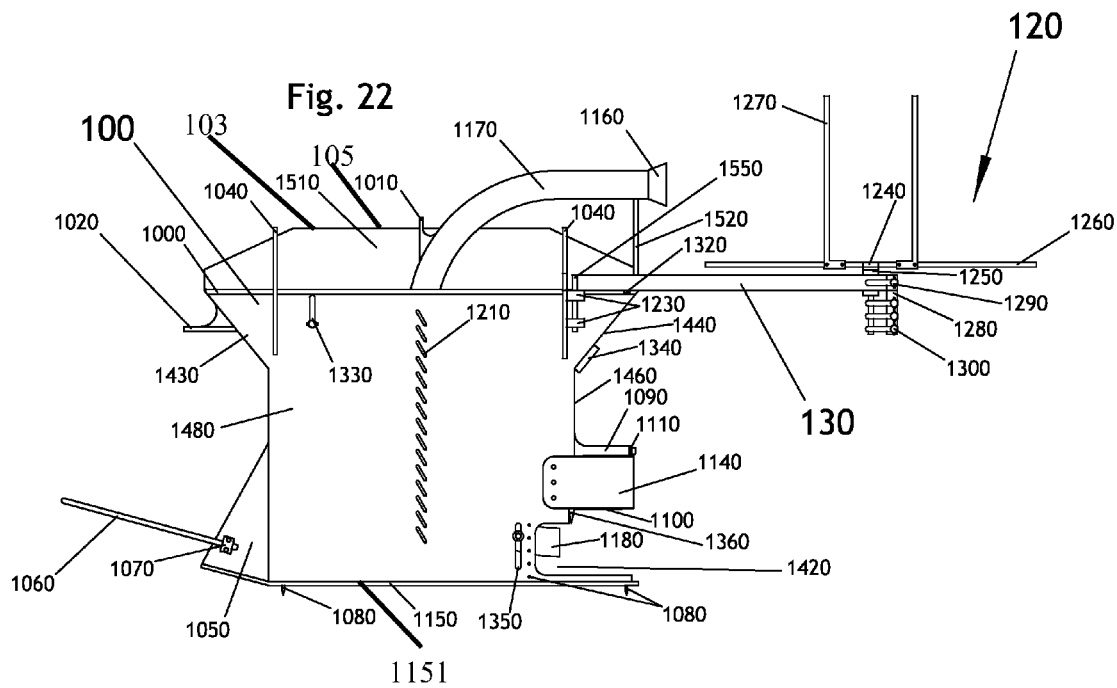
FIG. 22 illustrates an alternative embodiment of the invention showing an alternative position for the upper pipe sleeve (1160).

FIGS. 22 and 23 are alternative embodiments. FIG. 22 illustrates the mini excavator version is smaller in capacity as it will be necessary to use a separate loader machine to feed the device. Since the mini excavator does not have the task of loading the device, it can continue excavating and advancing uninterrupted. The loader machine could be a skid steer loader, tracked loader, or wheel loader. Because the loader will be available solely to feed the device, it is only necessary that device does not run out of aggregate. Aggregate volume can be kept to a minimum in order to keep the weight of the device proportional to the excavator's size. The mini excavator version is shorter in height due to the less need for reserve capacity. The mini excavator device is equipped with an aggregate shield plate (1510) that is fitted to the opposite side of the device that the loader is loading from. The upper pipe sleeve support bracket (1520) is used on the mini excavator version and is attached to the rear sloped wall (1440) and the upper pipe sleeve. The upper pipe sleeve support bracket provides vertical support for the upper pipe sleeve. FIG. 22 illustrates an extruder main body (100) which is the structural shell of the invention. The main body (100) is a hopper to store aggregate and also is a main frame to attach the other components of the device. The main body (100) is generally constructed from rigid planar materials including steel plate or sheet metal and other materials having structural characteristics capable of withstanding the receiving and expulsion of aggregate and of the structural stresses of being towed in a trench while filled with aggregate, sand or other trench filling materials.

Also shown in FIG. 22 is a rolled pipe turntable (120) which is a collapsible framework used as a rotating platform to hold a spooled conduit, cable or spooled pipe (170). The spooled pipe (170) unwinds from the roll as needed in order to feed into the device. The rolled pipe turntable (120) rotates as needed allowing the spooled pipe (170) to feed freely. The rolled pipe turntable (120) is not required for operation of the device as it may be desirable to use loose sections of pipe for shorter runs of leach line or to use up remnant pieces of pipe or to lay cable as seen in FIG. 23. The turntable arm (130), which is elongated and constructed from a rigid material, including metals and other rigid structural materials. The turntable arm (130) is removably connected to the main body (100) through the turntable arm mounts (1230). The turntable arm mounts (1230) are attached to both of the extruder main body (100) vertical side walls. The turntable arm mounts (1230) hold the turntable arm pin and allow it to fold forward against the main body (100) when the extruder main body (100) is configured for transport. The turntable hub (1240) rests inside turntable bearings (1250). The turntable hub (1240) has a vertical shaft that extends well below a lower turntable bearing. The turntable hub (1240) has a horizontal plate centered on top of the shaft and has square tube fittings arranged in a radial pattern laid horizontally to accept the turntable spokes. The turntable arm mounting pin (1550) is immovably fixed to the end of the turntable arm, by welding or similar manner, and rotatably fits into the turntable arm mounts (1230). For operations the turntable arm is extended. For transit the turntable arm is rotated against the main body (100) and secured by the turntable closed lock (1330). The turntable bearings (1250) are, as in the preferred embodiment, flange type bearings bolted to the upper and lower sides of the turntable arm (130). The turntable bearings (1250) hold the turntable hub (1240) and allow free movement of the turntable (120). The turntable spokes (1260) are square tubes attached to the turntable hub (1240) by a square pilot fitting extending from the inside of the tube end. The turntable spokes (1260) are held in place by the turntable perimeter strap. The turntable spokes (1260) support the pipe spool and rotate with the turntable hub while dispensing pipe. The pipe roll control arms (1270) are rigid vertical tubes that pin to the turntable spokes (1260) by way of a saddle fitting at the bottom end of the turntable arms (130). The pipe roll control arms (1270) are located at a constant radius from the center of the turntable hub (1240) to match the pipe roll inner diameter. The turntable drag arm (1280) is located at the rear end of the turntable arm (130). The turntable drag arm (1280) slides inside the open rear end of the tubular turntable arm (130). The turntable drag arm (1280) holds the turntable drag straps (1300). The turntable drag straps (1300) are attached to the turntable drag arm (1280). The turntable drag straps (1300) are rubber straps under tension that run around the turntable hub shaft to provide the drag necessary to stop the turntable when the extruder comes to rest after an advancement. By varying the number of turntable drag straps engaged, the amount of turntable drag can be adjusted. As the pipe roll decreases in diameter, less drag may be desired. The turntable arm retaining strap (1290) retains the turntable drag arm by connecting between the turntable arm (130) and the turntable drag arm. The turntable bearings (1250) are flange type bearings bolted to the upper and lower sides of the turntable arm. The turntable bearings hold the turntable hub and allow free movement of the turntable. The turntable bearings could also be configured as flanged bushings of UHMW material. The turntable perimeter strap (1310) encompasses the turntable spokes (1260) through slots or loops in the end of the turntable spokes (1260). The turntable perimeter strap is Nylon or other suitable material and is held under tension by a ratchet or bungee device. The turntable perimeter strap (1310) also prevents any pipe from being snagged by a turntable spoke (1260) in case of an over spin condition of the turntable. The turntable arm open lock (1320) is located on the outside of the rear vertical side wall of the extruder main body (100). The turntable arm open lock (1320) is, in the preferred embodiment, a pin or cam-lock device that retains the turntable arm (130) in the open position. One turntable open lock is located on each side of the device. The turntable closed lock (1330), preferably comprised of an elastic or rubber strap, is located on the outside of the vertical side wall of the extruder main body (100) towards the front of the device. One turntable open lock (1320) is located on each side of the device. The mounting pin extends both directions from the arm (above and below) in order to allow the arm to function on either side of the device. The turntable arm (130) is just turned upside down in order to operate on the opposite side of the device. It may be desirable to operate the arm on one side of the other according to the placement of spoils along the trench or the direction of rotation that the pipe roll was wound at the factory. The turntable component storage rack (1340) is located on the outside of the sloped rear end wall (1440) of the device. The turntable component storage rack (1340) is a row of square tubes that hold the turntable spokes (1260) and turntable control arms during transport or when not being used.

Also illustrated in FIG. 22 are lower pipe sleeve adjustment slots (1350) are located in the lower side walls of the extruder main body (100). The lower pipe sleeve adjustment slots (1350) allow for the vertical adjustment of the lower pipe sleeve and the pipe elevation within the leach line extrusion.

The aggregate screed blade (1360) is bolted inside the lower rear of the extruder main body (100) just above the extrusion exit opening (1420). The extrusion exit openings (1420) are located in the lower rear of the extruder main body, the lower rear of the ling width extension, the lower side plates of the extruder main body, and the extension. The aggregate screed blade (1360) is a hardened steel replaceable plate that is vertically adjustable according to the desired leach line thickness.

Also seen in FIG. 22 is the top rail strapping edge (1000) is comprised of a slotted pipe that fits over the top edge of the extruder main body (100). The primary purpose of the top rail strapping edge (1000) is to provide a round edge suitable to fit a load strap without having to further protect the strap from a sharp edge during transport between job sites. The top rail strapping edge (1000) also reinforces the top rail of the extruder main body (100). The lifting eye cross member (1010) is attached to the inside walls of the extruder main body (100) and extends above the center of the device main body (100). The lifting eye cross member (1010) provides a convenient and safe way of lifting the device with a crane when needed. The lifting eye cross member (1010) is sufficiently sized to allow the direct engagement and release of a crane hook without another chain or clevis in between.

Also illustrated in FIG. 22 is the trenching bucket lifting coupler (1020) which is attached to the extruder main body (100) front sloped wall (1430). The trenching bucket lifting coupler (1020) is a horizontal lifting lug with a hole to accept the pin from the trenching bucket lifting pin (1030). The opening is triangular in shape with radiused corners. The opening is much larger in the rear than in the front. This allows for easy capture of the device with the trenching bucket lifting pin (1030). The front of the opening matches the diameter of the trenching bucket lifting pin (1030). The trenching bucket lifting coupler (1020) provides a way to lift the extruder into and out of the trench using the excavating machine's trenching bucket without any outside action required by personnel on the ground or the excavating machine (150) operator. The clearance inside the trench is minimal between the device and the trench walls. The excavating machine (150) operator has, by far, the best vantage point from which to safely place the device into the trench. The excavating machine (150) commonly used for leach line construction is the backhoe loader. Other suitable machines may include hydraulic excavators, chain style trenchers, bucket wheel style trenchers, or rock wheel trenchers. The loader bucket (160) is used to load the device with aggregate. The loader bucket commonly used is part of the backhoe loader backhoe. Other suitable styles of loader buckets used may be on wheel loaders, skid steer wheel loaders, or tracked loaders.

FIG. 22 also shows a skid nose (1050) which is composed of plates extending between the extruder skid plate and the extruder main body (100) front wall. The skid nose (1050) provides a place to mount the pull cable (1060). The plate also prevents the top of extruder skid plate from accumulating dirt. The pull cable (1060) provides a way for the excavating machine (150) to advance the device down the trench during excavation. The pull cable (1060) is engaged by one of the excavating machine's bucket teeth when pulling. The pull cable (1060) is easily replaceable when worn. The cable attachment fittings (1070) attach the pull cable (1060) to the skid nose (1050). Illustrated in FIG. 22 are scarifiers (1080) which provide scarification along the trench bottom and the trench sidewalls as the device is advanced down the trench. Some soils are susceptible to compaction and smearing. The scarifiers (1080) are usually installed only when working in these soils. The scarifiers (1080) ensure that the soil is properly loosened just before the aggregate is placed in the trench. The scarifiers (1080) are easily replaceable when needed.

Seen in FIG. 22 are geotextile fabric holder brackets (1090) which are attached to the outside of the extruder main body (100) vertical rear wall. The geotextile fabric holder brackets (1090) are threaded to accept the bolts that hold the geotextile fabric door (1110). The geotextile fabric door (1110) is an Ultra High Molecular Weight plastic (UHMW) plate bolted to the geotextile fabric holder brackets. The geotextile fabric door has vertical slotted holes to allow for the opening of the holder when loading fabric. The fabric holder floor plate (1100) is a horizontal plate attached outside of the rear vertical wall (1460) of the extruder main body (100). The fabric holder floor plate (1100) holds the horizontal slide plate and the geotextile filter fabric roll. The geotextile fabric door handhold (1120) is a horizontal slot centered just below the top of the geotextile fabric door to allow the door to be opened by hand. The geotextile slide plates (1130) are UHMW plates located on the rear vertical wall of the extruder main body (100) and the geotextile fabric floor plate. The geotextile slide plates allow the geotextile fabric to roll freely as needed. The geotextile slide plates are replaceable as needed. The geotextile side protector plates (1140) are UHMW plates bolted to the vertical sidewall of the extruder main body and the line width extension (140) using countersunk bolts. The geotextile side protector plates protect the fabric roll from tree roots, large rocks, or other obstructions encountered inside the trench. The geotextile side protector plates also exert pressure to the sides of the roll to stabilize it from bouncing and to prevent over spinning as the device comes to rest. The geotextile filter fabric (180) used in the device is produced in rolls of flat fabric. The filter fabric used is sized to match the trench width and meet local jurisdictional standards. The filter fabric is used to cover the leach line aggregate and prevent soil intrusion from above the leach line. Some soils and jurisdictions may require the use of paper based products instead of fabric. The leach line aggregate (190) most commonly used is mined, washed, and graded river rock or blasted, crushed, and graded, bedrock. Other types of aggregate may include, but are not limited to, tire chips, crushed glass, glass beads, plastic beads, or polystyrene beads.

Also seen in FIG. 22 is that the extruder main body (100) is also composed of the following structures: The rear vertical wall (1460) is the lower portion on the rear of the extruder main body. The left side vertical wall (1470) is the lower portion of the left side of the extruder main body. The right side vertical wall (1480) is the lower portion of the right side of the extruder main body.

FIG. 22 also shows the extruder skid plate (1150) located at the bottom of the device. The extruder skid plate (1150) has a large center opening to allow the weight of the leach line aggregate to be supported inside the trench bottom instead of the device. The extruder skid plate (1150) holds the bottom mounted scarifiers of the extruder main body. The extruder skid plate (1150) is fashioned to provide narrow runners that run along just inside the edge, most of the way along the bottom of the device. The extruder skid plate (1150) has an upwardly angled section below the skid nose (1050) to provide clearance of uneven soil in the trench. The extruder skid plate (1150) can be fitted with replaceable UHMW wear plates.

FIG. 23 shows the cable version is equipped with side cable intake ports and pipe sleeves to allow flexible electrical cable, pipe, fiber optic, and etc. to be laid out along the trench then pulled into the extrusion as the device advances along the trench bottom. The side cable intake ports (1530) are located on the side of the device and are used to intake the cable or pipe product into the device. The side cable intake ports can be located on either side of the device. The device can be equipped with multiple intake ports and multiple pipe sleeves to deposit line in the same trench simultaneously. The multiple lines may be located at different elevations and different lateral locations within the extrusion as needed. The cable version need not be equipped with a spooled pipe turntable. The cable version is equipped with transparent bedding aggregate volume windows instead of slots as bedding aggregate may be much smaller rock or sand as opposed to leach line aggregate's larger size. The bedding aggregate volume windows (1540) are used on the cable version. The bedding aggregate volume windows are transparent material used to view the volume of bedding aggregate in the device.

The mini excavator version, seen in FIG. 22, is smaller in capacity as it will be necessary to use a separate loader machine to feed the device. Since the mini excavator does not have the task of loading the device, it can continue excavating and advancing uninterrupted. The loader machine could be a skid steer loader, tracked loader, or wheel loader. Because the loader will be available solely to feed the device, it is only necessary that device does not run out of aggregate. Aggregate volume can be kept to a minimum in order to keep the weight of the device proportional to the excavator's size. The mini excavator version is shorter in height due to the less need for reserve capacity. The mini excavator device is equipped with an aggregate shield plate (1510) that is fitted to the opposite side of the device that the loader is loading from.

The cable version seen in FIG. 23, is equipped with at least one side cable intake port (1530) and pipe sleeves (1180) to allow flexible electrical cable, pipe, fiber optic, and etc. to be laid out along the trench then pulled into the extrusion (1420) as the device (100) advances along the trench bottom. The device (100) can be equipped with multiple intake ports and multiple pipe sleeves to deposit line in the same trench simultaneously. The multiple lines may be located at different elevations and different lateral locations within the extrusion as needed. The cable version need not be equipped with a spooled pipe turntable. The cable version is equipped with transparent bedding aggregate volume windows instead of slots as bedding aggregate may be much smaller rock or sand as opposed to leach line aggregate's larger size.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims. Various features of the invention are set forth in the appended claims.

I claim:

1. A trenching pipe laying device comprising the following:
   an extruder main body (100) which is a structural shell of the device; the said extruder main body (100) having an inside (103) comprising an aggregate hopper (105);
   a turntable arm (130) which is elongated and constructed from a rigid material, including metals and other rigid structural materials, is affixed to the rolled pipe turntable (120) and is removably connected to the main body (100);
   a trenching bucket lifting coupler (1020) is attached to the extruder main body (100);
   geotextile fabric holder brackets (1090) are attached to an outside of the extruder main body (100) to which are affixed, by mechanical devices, a geotextile fabric door (1110) having a geotextile fabric door handhold (1120) and geotextile slide plates (1130) which allows geotextile fabric to roll freely as pipe laying proceeds;
   an extruder skid plate (1150), located at the bottom of the device main body (100), has a large center opening (1151) to allow leach line aggregate, having weight, to be supported at a trench bottom instead of the device;
   a pipe intake cone (1160);
   an upper pipe sleeve (1170) is immovably connected to the pipe intake cone (1160) and is rigidly connected to a telescope sleeve crossmember (1190); the lower pipe sleeve (1180) is rigidly connected to the telescope sleeve crossmember (1190) and is in alignment with and interconnected with the upper pipe sleeve (1170);
   the lower pipe sleeve (1180) is attached to lower pipe sleeve mounts (1200) and rests inside the telescope sleeve cross member (1190); the interconnected upper pipe sleeve (1170) and the lower pipe sleeve (1180) are in pipe communication and deliver flexible pipe through the aggregate hopper to a vertical location within a leach line extrusion; and, the telescope sleeve cross member (1190) is attached to an inside of vertical side walls of the extruder main body (100) and the upper pipe sleeve (1180); the interconnected upper pipe sleeve (1170) and the lower pipe sleeve (1180) co-exist with the aggregate within the aggregate hopper (105);
   an extrusion exit opening (1420), at a lower rear of the main body (100), dispenses the aggregate through the extrusion exit opening (1420); the lower pipe sleeve (1180) extends proximal to and terminates proximal to the extrusion exit opening (1420);
   pipe is dispensed via the lower pipe sleeve (1180) where both aggregate and the pipe are covered with a geotextile fabric.

2. A trenching pipe laying device comprising the following:
   an extruder main body (100), having an inside (103) comprising an aggregate hopper (105); and a front vertical wall (1450) which is a lower vertical portion on a front of the extruder main body;
   at least one pipe intake port (1530); an extrusion exit opening (1420) is at a lower rear of the main body (100); at least one pipe sleeve (1180) extending from the at least one pipe intake port (1530) to the extrusion exit opening (1420) with the at least one pipe sleeve (1180) co-existing with aggregate within the aggregate hopper (105);
   an extruder skid plate (1150) having a large center opening (1151);
   a trenching bucket lifting coupler (1020);
   the at least one pipe sleeve (1180) receives pipe at the at least one pipe intake port (1530) and dispenses pipe at the extrusion exit opening (1420); and
   aggregate is dispensed from the extrusion exit opening (1420) and from the large center opening (1151).

3. The trenching pipe laying device depending from claim 2 comprising the following:
   the extruder main body (100) is a structural shell of a trenching pipe laying device;
   the extruder skid plate (1150) is located at the bottom of a device main body (100); and
   the trenching bucket lifting coupler (1020) is attached to the extruder main body (100).

4. The trenching pipe laying device depending from claim 3 comprising the following:
   the at least one pipe intake port (1530) is a pipe intake cone (1160);

the at least one pipe sleeve (1180) is comprised of an upper pipe sleeve (1170) which is in alignment with and interconnected with a lower pipe sleeve (1180); the said upper pipe sleeve (1170) and the said lower pipe sleeve (1180) are rigidly connected to a telescope sleeve crossmember (1190) which is within the said aggregate hopper (105);

the said lower pipe sleeve (1180) is attached to lower pipe sleeve mounts (1200) and rests inside the telescope sleeve cross member (1190); the interconnected upper pipe sleeve (1170) and the lower pipe sleeve (1180) are in pipe communication and deliver a flexible pipe through the aggregate hopper to a proper vertical location within a leach line extrusion; and, the telescope sleeve cross member (1190) is attached to an inside of vertical side walls of the extruder main body (100) and the upper pipe sleeve (1180); the said interconnected upper pipe sleeve (1170) and the said lower pipe sleeve (1180) co-exist with aggregate within the aggregate hopper (105);

the upper pipe sleeve (1170) is movably and slidably inserted into the said lower pipe sleeve (1180);

the pipe intake cone (1160) guides the flexible pipe into the upper pipe sleeve (1170);

geotextile fabric holder brackets (1090) are attached to the outside of the extruder main body (100); affixed to the geotextile fabric holder brackets (1090), by mechanical devices, is a geotextile fabric door (1110) having a geotextile fabric door handhold (1120) and geotextile slide plates (1130) which allow geotextile fabric to roll freely as pipe laying proceeds;

at the extrusion exit opening both the aggregate and the pipe are covered with the geotextile fabric; and the extruder skid plate (1150) has a large center opening (1151) to allow the weight of leach line aggregate to be supported inside a trench bottom instead of at the bottom of the device main body (100).

5. The trenching pipe laying device depending from claim 4 further comprising:

a rolled pipe turntable (120);

a turntable arm (130);

the rolled pipe turntable (120) holds a spooled conduit, cable or spooled pipe;

the turntable arm (130) is elongated and constructed from a rigid material and is removably connected to the main body (100);

the rolled pipe turntable (120) holds a spooled conduit, cable or spooled pipe;

the turntable arm (130) is constructed from a rigid material including metals and other rigid structural materials and is affixed to the rolled pipe turntable (120);

a removable side plate (1370) at a side of the extruder main body (100) proximal the bottom and proximal the extruder skid plate (1150); the removal of the side plate (1370) exposes an extension supply opening (1380); a line width extension (140) extends outwardly from the side of the extruder main body (100) and is removably affixed over the extension supply opening (1380); the extension supply opening (1380) allows aggregate to feed into the line width extension (140) and out of the line width extension (140) bottom and onto the trench bottom; the line width extension (140) may be affixed at a left side vertical wall (1470) which is above the side plate (1370) on the left side of the extruder main body (100), or at a right side vertical wall (1480) which is at the right side of the extruder main body (100); an extension rear vertical wall (1500) is at the rear of the line width extension (140);

the pipe intake cone (1160) is located in an upper vertical wall of the extruder main body (100);

at or proximal to the line width extension (140) bottom and side are scarifiers (1080) which are elongated and outwardly extending toward the trench bottom and trench side and formed of removable and replaceable rigid material including hardened steel or carbide;

at the line width extension (140) and at the left side vertical wall (1470) or at the right side vertical wall (1480) of the extruder main body (100) proximal a trench are geotextile side protector plates (1140) composed of rigid material including metals and plastic, the geotextile side protector plates (1140) protect the fabric roll from tree roots, large rocks, or other obstructions encountered inside the trench; the geotextile side protector plates (1140) also exert pressure to the sides of the fabric roll to stabilize the fabric roll from bouncing and to prevent over spinning as the device comes to rest; and the extruder skid plate (1150) has an upwardly angled section below a skid nose to provide clearance of uneven soil in the trench.

6. The trenching pipe laying device depending from claim 5 comprising the following:

the rigid materials composing the geotextile side protector plates (1140) include UHMW, high density polyethylene, plates having a low coefficient of friction; the geotextile side protector plates (1140) are removably affixed to the left side vertical wall (1470) and at the right side vertical wall (1480) of the extruder main body (100); the line width extension (140) may be affixed at both the left side vertical wall (1470) and at the right side vertical wall (1480);

a top rail strapping edge (1000) fits over a top edge of the extruder main body (100); the top rail strapping edge (1000) is comprised of a slotted pipe which provides a round edge suitable to fit a load strap without having to further protect the strap from a sharp edge during transport between job sites and the top rail strapping edge (1000) also reinforces a top rail of the extruder main body (100);

a lifting eye cross member (1010) is attached to inside walls of the extruder main body (100) at a top of the hopper and extends above a center of the device main body (100); the lifting eye cross member (1010) provides a convenient and safe way of lifting the device with a crane when needed; the lifting eye cross member (1010) is sized to allow the direct engagement and release of a crane hook without another chain or clevis in between;

a trenching bucket lifting coupler (1020) is attached to the extruder main body (100) at an extruder main body front sloped wall (1430); the trenching bucket lifting coupler (1020) is a horizontal lifting lug triangular in shape with radiused corners and with a hole to accept a pin from a trenching bucket lifting pin (1030); an opening is larger at a rear of the device than in a front allowing for easy capture of the device with the trenching bucket lifting pin (1030); the front of the opening matches the diameter of the trenching bucket lifting pin (1030); the trenching bucket lifting coupler (1020) provides a way to lift the extruder main body (100) into and out of the trench using the trenching bucket of an excavating machine (150) without any outside action required by personnel on the ground or an excavating machine operator;

the skid nose (1050) is composed of plates extending between the extruder skid plate (1150) and the extruder main body front sloped wall (1430); the skid nose (1050) provides a place to mount a pull cable (1060) and also prevents a top of extruder skid plate (1150) from accumulating dirt; the pull cable (1060) provides a way for the excavating machine (150) to advance the device down the trench during excavation: the pull cable (1060) is engaged by one of the bucket teeth of the trenching bucket when pulling and is easily replaceable when worn; cable attachment fittings (1070) attach the pull cable (1060) to the skid nose (1050);

the extruder main body (100) is also composed of the following structures: a rear vertical wall (1460) is at a lower portion on a rear of the extruder main body (100) and a rear sloped wall (1440) is above the rear vertical wall (1460) sloping outwardly; the front sloped wall (1430) slopes outwardly and is above a front vertical wall (1450);

the rolled pipe turntable (120) is a collapsible framework used as a rotating platform to hold a spooled conduit, cable or spooled pipe (170); the spooled pipe (170) unwinds from the roll in order to feed into the device; the rolled pipe turntable (120) rotates allowing the spooled pipe (170) to feed freely; the rolled pipe turntable (120) is not required for operation of the device as the rolled pipe turntable (120) may be desirable to use loose sections of pipe for shorter runs of leach line or to use up remnant pieces of pipe or to lay cable; the primary type of pipe (170) that the device is used is flexible pipe including the single wall, corrugated, perforated pipe constructed of high density polyethylene (HDPE) known as ASTM F405;

the turntable arm (130) is elongated and constructed from a rigid material, including metals and other rigid structural materials; the turntable arm (130) is removably connected to the extruder main body (100) through turntable arm mounts (1230); the turntable arm mounts (1230) are attached to both of the extruder main body (100) vertical side walls; the turntable arm mounts (1230) hold a turntable arm pin and allow it to fold forward against the extruder main body (100) when the extruder main body (100) is configured for transport; a turntable hub (1240) rests inside turntable bearings (1250); the turntable hub (1240) has a vertical shaft that extends below the lower turntable bearing; the turntable hub (1240) has a horizontal plate centered on top of the shaft and has square tube fittings arranged in a radial pattern laid horizontally to accept turntable spokes; the turntable arm mounting pin (1550) is immovably fixed to an end of the turntable arm and rotatably fits into the turntable arm mounts (1230); for operations the turntable arm is extended; for transit the turntable arm (130) is rotated against the main body (100) and secured by a turntable closed lock (1330);

the turntable bearings (1250) are removably affixed to the upper and lower sides of the turntable arm (130); the turntable bearings (1250) include flange type bearings; the turntable bearings (1250) hold the turntable hub (1240) and allow free movement of the turntable (120); the turntable spokes (1260) are square tubes attached to the turntable hub (1240) by a square pilot fitting extending from an inside of a tube end; the turntable spokes (1260) are held in place by a turntable perimeter strap (1310); the turntable spokes (1260) support the pipe spool and rotate with the turntable hub (1240) while dispensing the pipe; pipe roll control arms (1270) are rigid vertical tubes that pin to the turntable spokes (1260) by way of a saddle fitting at the bottom end of the turntable arms (130); the pipe roll control arms (1270) are located at a constant radius from the center of the turntable hub (1240) to match the pipe roll inner diameter; a turntable drag arm (1280) is located at a rear end of the turntable arm (130); the turntable drag arm (1280) slides inside the the tubular turntable arm (130) open rear end; the turntable drag arm (1280) holds turntable drag straps (1300); the turntable drag straps (1300) are attached to the turntable drag arm (1280); the turntable drag straps (1300) are rubber straps under tension that run around the turntable hub shaft to provide the drag necessary to stop the turntable when the extruder comes to rest after an advancement and, by varying the number of turntable drag straps (1300) engaged, the amount of turntable drag can be adjusted; as the pipe roll decreases in diameter, less drag may be desired; a turntable arm retaining strap (1290) retains the turntable drag arm (1280) by connecting between the turntable arm (130) and the turntable drag arm (1280); the turntable bearings (1250) hold the turntable hub and allow free movement of the turntable; the turntable bearings (1250) can be configured as flanged bushings of UHMW material;

the turntable perimeter strap (1310) encompasses the turntable spokes (1260) through slots or loops in the end of the turntable spokes (1260); the turntable perimeter strap (1310) is fabric including nylon and is held under tension by a ratchet or bungee device; the turntable perimeter strap (1310) prevents pipe from being snagged by a turntable spoke (1260) in case of an over spin condition of the turntable; at least one turntable open lock (1320) is located on the outside of the rear vertical side wall of the extruder main body (100); the at least one turntable arm open lock (1320) retains the turntable arm (130) in the open position and may be comprised of a pin or cam-lock; the at least one turntable arm open lock (1320) may be a turntable arm open lock (1320) located at the left side vertical wall (1470) and a separate turntable arm open lock (1320) located at the right side vertical wall (1480) of the extruder main body (100); at least one turntable closed lock (1330) may be located on the outside of the vertical side wall of the extruder main body (100) towards the front of the device; the mounting pin extends both directions, above and below, from the arm in order to allow the arm to function on either side of the device; the turntable arm (130) is just turned upside down in order to operate on the opposite side of the device;

a turntable component storage rack (1340) is located on the outside of the sloped rear end wall of the device; the turntable component storage rack (1340) is a row of square tubes that hold the turntable spokes (1260) and turntable control arms during transport or when not being used; lower pipe sleeve adjustment slots (1350) are located in the lower side walls of the extruder main body (100); the lower pipe sleeve adjustment slots (1350) allow for the vertical adjustment of the lower pipe sleeve (1180) and the pipe elevation within the leach line extrusion; an aggregate screed blade (1360) is affixed inside the lower rear of the extruder main body (100) above an extrusion exit openings (1420); the said extrusion exit openings (1420) are located in the lower rear of the extruder main body (100), the lower rear of the line width extension (140), the lower side plates of the extruder main body (100), and the extension; the aggregate screed blade (1360) is a hardened steel replaceable plate that is vertically adjustable according to the desired leach line thickness;

an extension screed plate (1400) is rigidly affixed inside the rear of the line width extension (140); the extension screed plate (1400) is a hardened steel replaceable plate that is vertically adjustable according to the leach line thickness desired; the extension screed blade adjustment slots (1410) are located in the rear of the line width extension (140) just above the extrusion exit opening of the line width extension (140); the extension screed adjustment slots (1410) are vertical slots through which the extension screed blade is affixed;

clearance inside the trench is minimal between the device and the trench walls; the trenching bucket lifting pin (1030) is a vertical pin attached to the excavating machine (150) at the center rear of the bucket; the methods of attachment may vary according to the machine being used; the trenching bucket lifting pin (1030) may be welded, bolted, riveted, or pinned on to the trenching bucket; the pin (1030) is designed to connect to the trenching bucket lifting coupler (1020) when lifting the trenching pipe laying device; and loader bucket lifting couplers (1040) provide a way to safely and positively carry the extruder with the loader bucket of the loader being used; the loader bucket lifting couplers (1040) allow the loader to lift, carry and place the extruder without any outside help on the ground making the process safer than use of chain, cable, of strap lifting the device as the control of the device while reducing swinging of the device.

7. The trenching pipe laying device depending from claim 6 further comprising:

an upstanding aggregate shield plate (1510) is fitted to the opposite side of the device from which a loader is loading aggregate into the device; the pipe intake cone (1160) extends above the aggregate hopper (105) and the pipe intake cone (1160) and the upper pipe sleeve (1170) rigidly supported by an upper pipe sleeve support bracket (1520) which is attached to the rear sloped wall (1440).

8. The trenching pipe laying device depending from claim 3 further comprising:

the at least one pipe intake port (1530) is at least one pipe sleeve (1180) which are sized to slidably receive and transport flexible cable including electrical cable, pipe and fiber optic cable; and bedding aggregate volume windows (1540), comprised of a transparent material, are positioned on one or both sides of the said extruder main body (100) and positioned to allow observation of the level of aggregate, including sand, contained within the said aggregate hopper (105).

9. The trenching pipe laying device depending from claim 8 further comprising:

a rolled pipe turntable (120) which holds a spooled conduit, cable or spooled pipe; and, a turntable arm (130) which is elongated and constructed from a rigid material, including metals and other rigid structural materials, is affixed to the rolled pipe turntable (120) and is removably connected to the main body (100).

* * * * *